(12) United States Patent
Itoh et al.

(10) Patent No.: US 8,717,268 B2
(45) Date of Patent: May 6, 2014

(54) DISPLAY DEVICE

(75) Inventors: Ryohki Itoh, Osaka (JP); Satoshi Horiuchi, Osaka (JP); Yuhko Hisada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1165 days.

(21) Appl. No.: 12/664,267

(22) PCT Filed: Jun. 9, 2008

(86) PCT No.: PCT/JP2008/060557
§ 371 (c)(1),
(2), (4) Date: Dec. 11, 2009

(87) PCT Pub. No.: WO2008/153003
PCT Pub. Date: Dec. 18, 2008

(65) Prior Publication Data
US 2010/0188437 A1   Jul. 29, 2010

(30) Foreign Application Priority Data

Jun. 14, 2007   (JP) ................................. 2007-157738

(51) Int. Cl.
*G09G 3/36*   (2006.01)
(52) U.S. Cl.
USPC ................................ 345/89; 345/100; 345/90
(58) Field of Classification Search
USPC ........................................ 345/87, 88, 89, 100
See application file for complete search history.

(56) References Cited

U.S. PATENT DOCUMENTS

| | | | |
|---|---|---|---|
| 6,552,706 B1 | 4/2003 | Ikeda et al. | |
| 8,189,154 B2* | 5/2012 | Nakagawa | 349/129 |
| 2003/0146893 A1* | 8/2003 | Sawabe | 345/89 |
| 2003/0227429 A1* | 12/2003 | Shimoshikiryo | 345/90 |
| 2005/0088385 A1* | 4/2005 | Elliott et al. | 345/87 |
| 2007/0205972 A1 | 9/2007 | Asao et al. | |
| 2008/0049042 A1* | 2/2008 | Yang et al. | 345/589 |
| 2008/0069479 A1* | 3/2008 | Park et al. | 382/300 |
| 2008/0192178 A1* | 8/2008 | Ben-David et al. | 349/68 |
| 2009/0121992 A1* | 5/2009 | Asao et al. | 345/88 |

FOREIGN PATENT DOCUMENTS

JP   2006-106062 A   4/2006
WO   WO2005111706   * 11/2005   ............ G02F 1/1334

OTHER PUBLICATIONS

Official Communication issued in International Patent Application No. PCT/JP2008/060557, mailed on Jul. 8, 2008.

* cited by examiner

*Primary Examiner* — Quan-Zhen Wang
*Assistant Examiner* — Calvin C Ma
(74) *Attorney, Agent, or Firm* — Keating & Bennett, LLP

(57) ABSTRACT

A display device prevents luminance unevenness that occurs in the case of inversion driving being performed, and performs high quality image display, while selectively scanning two lines of picture elements constituting a single pixel using a single gate wiring, as in the case of multi-primary color image display. The display device includes a display element including a pixel constituted by a plurality of picture elements disposed in two lines in a longitudinal direction and two or more columns in a lateral direction, a gate wiring common to the plurality of picture elements, and a source wiring that is arranged perpendicular or substantially perpendicular to the gate wiring and to perform image display using inversion driving in which an image display signal is provided to the picture elements connected to the gate wiring which is sequentially selected, at a different polarity than a polarity of an immediately previous frame, and an array of the picture elements in the pixel is determined so as to compensate for a change in luminance following the change in the effective value relative to the image display signal of the picture elements belonging to one line.

16 Claims, 13 Drawing Sheets

| | White | (W) |
|---|---|---|
| ↑ Bright | Yellow | (Y) |
| | Cyan | (C) |
| | Green | (G) |
| | Magenta | (M) |
| ↓ Dark | Red | (R) |
| | Blue | (B) |

DISPLAY DEVICE

BACKGROUND OF THE INVENTION

1. Field of the Invention

The present invention relates to a display device in which pixels are constituted by two lines of picture elements connected to a single gate wiring, and more particularly, to a display device that makes luminance unevenness less likely to occur by the array of picture elements, even when inversion driving is performed.

2. Description of the Related Art

In recent years, flat display devices such as liquid crystal display devices and EL display devices characterized by having low power consumption and being slim and lightweight have been widely used as display devices such as television receivers. With flat panels such as liquid crystal panels and EL panels used in flat display devices, image display is normally performed with a driving method called an active matrix method. This active matrix method involves displaying an image by selecting and driving TFTs, which are switching elements formed in each of a plurality of picture elements arrayed in a line direction and a column direction, depending on signals from gate wirings disposed along the line direction and source wirings disposed along the column direction, to control the luminance of each of the picture elements.

Adverse effects such as degradation of a liquid crystal layer or an EL layer being caused or responsiveness to image signals deteriorating when image signals are continuously applied at the same polarity are known to occur with liquid crystal panels and EL panels used in flat display devices. So-called inversion driving is thus performed whereby, whenever a signal for displaying an image is input, driving is performed after inverting the polarity of the signal. This operation of inverting the polarity of an image display signal is called frame inversion driving if performed with regard to the picture elements of the entire panel constituting a single screen, line inversion driving if performed for each line formed by picture elements, and dot inversion driving if performed for each adjoining picture element.

Conventionally, a technique is known for realizing the above-described inversion driving while using a so-called center gate method, which is a technique for connecting two lines of picture elements to a single gate wiring, and increasing the time for which an image display signal is applied to the TFT formed in each picture element, in an active matrix type liquid crystal panel serving as a display element (JP 2001-33757A).

FIG. 14 is a main portion enlarged view showing the configuration of an image display area 101 of such a conventional liquid crystal panel 100.

As shown in FIG. 14, in the image display area 101 of this conventional liquid crystal panel 100, a single pixel 102 is constituted by disposing four picture elements 103 consisting of red (R), blue (B) and two green (G1, G2) picture elements in two lines in a longitudinal direction and two columns in a lateral direction. A gate wiring 105 is disposed along the lines of picture elements, between the first line to which the R and G1 picture elements belong and the second line to which the B and G2 picture elements belong. Also, two source wirings 106 are disposed for each column of picture elements 103, so as to sandwich each picture element 103 laterally.

With the liquid crystal panel 100 shown in FIG. 14, respective picture elements in the same position in laterally adjoining pixels 102 are connected to source wirings on different sides. For example, with the pixels 102 positioned on the left side in FIG. 14, the R picture elements are connected to the source wiring 106 that is on the left side of the column of picture elements 103 and has positive polarity data applied thereto, whereas with the pixels 102 positioned on the right side, the same R picture elements are connected to the source wiring 106 that is on the right side of the column of picture elements 103 and has negative polarity data applied thereto. Note that with the pixels 102 lined up in the longitudinal direction, same color picture elements 103 in the same position are all connected to the same source wiring 106.

In each picture element 103, a TFT 104, which is a switching element for driving, is connected to the gate wiring 105 and the source wiring 106 to which that picture element 103 is connected. Also, the gate wirings 105 are sequentially selected by a gate driver 107, and the source wirings 106 are connected to a source driver 108 and apply signals for image display to the TFTs 104 of the picture elements 103 connected to a selected gate wiring 105.

Thus, with the conventional liquid crystal panel shown in FIG. 14, since same color picture elements disposed in the same position in laterally adjoining pixels are connected to source wirings to which different polarity data is applied, the polarity of adjoining picture elements for displaying an image will be inverted even in the case where a monochromatic screen is displayed. Accordingly, a luminance difference produced by the polarities of the voltages applied to the liquid crystal layer will be canceled, enabling the occurrence of flicker to be effectively reduced, even in the case of monochromatic image display.

In recent years, multi-primary color image display using multi-primary color picture elements has been performed, in order to expand the color reproduction range of flat panels. This multi-primary color image display involves constructing a single pixel with a combination of light from picture elements of four or more colors, by forming picture elements of not only the three colors RGB used in normal color display but also a white (W) picture element or picture elements of cyan (C), magenta (M) and yellow (Y) that are in a complementary color relationship with the three RGB colors, for example. At this time, because the shape of a pixel desirably is point-like more than linear, normally a single pixel is constituted in the form of two lines and three columns if six colors and two lines and two columns if four colors, rather than arranging the multi-primary color picture elements in one line to form a single pixel.

In the case where a single pixel is constituted by two lines of picture elements, the problem of a signal writing time to the driving TFT disposed in each picture element being shortened, due to not increasing the number of gate wirings as a result of applying a technique of driving two lines of picture elements with a single gate wiring as shown as the above conventional technique, is thus avoided.

However, the occurrence of streaky luminance unevenness on the display screen has been confirmed, in the case where inversion driving such as dot inversion driving or line inversion driving is performed, while sequentially selecting and scanning two lines of picture elements using a single gate wiring, in multi-primary color image display.

SUMMARY OF THE INVENTION

In view of the above-described problems, preferred embodiments of the present invention provide a display device that prevents luminance unevenness that occurs in the case of inversion driving being performed, and performs high quality image display, while selectively scanning two lines of picture elements constituting a single pixel using a single gate wiring, as in the case of multi-primary color image display.

A display device according to a preferred embodiment of the present invention includes a display element including a pixel constituted by a plurality of picture elements disposed in two lines in a longitudinal direction and two or more columns in a lateral direction, a gate wiring common to the plurality of picture elements, and a source wiring arranged perpendicular or substantially perpendicular to the gate wiring and to perform image display using inversion driving in which an image display signal is provided to picture elements connected to the gate wiring which is sequentially selected, at a different polarity than a polarity of an immediately previous frame. An effective value relative to the image display signal of picture elements belonging to one of the two lines changes as a result of the inversion driving of picture elements constituting another pixel disposed longitudinally adjacent to the one line, and an array of the picture elements in the pixel is determined such that a size of a total value of an index representing a brightness of picture elements belonging to the one line and a total value of the index representing the brightness of picture elements belonging to the other of the two lines compensates for a change in luminance following the change in the effective value of picture elements belonging to the one line.

According to various preferred embodiments of the present invention, a display device is provided that has wide color reproducibility due to multi-primary color image display, and that secures the writing time to a TFT disposed in each picture element, and further performs high quality image display in which luminance unevenness does not occur even when inversion driving is performed.

Other elements, features, steps, characteristics and advantages of the present invention will become more apparent from the following detailed description of the preferred embodiments with reference to the attached drawings.

BRIEF DESCRIPTION OF THE DRAWINGS

FIG. 9 shows preferred picture element array patterns for different polarity change patterns and image display modes of inversion driving.

FIGS. 10A and 10B show picture element array patterns according to a second preferred embodiment of the present invention.

FIGS. 11A and 11B show other picture element array patterns according to the second preferred embodiment of the present invention.

DETAILED DESCRIPTION OF THE PREFERRED EMBODIMENTS

Figure 1:
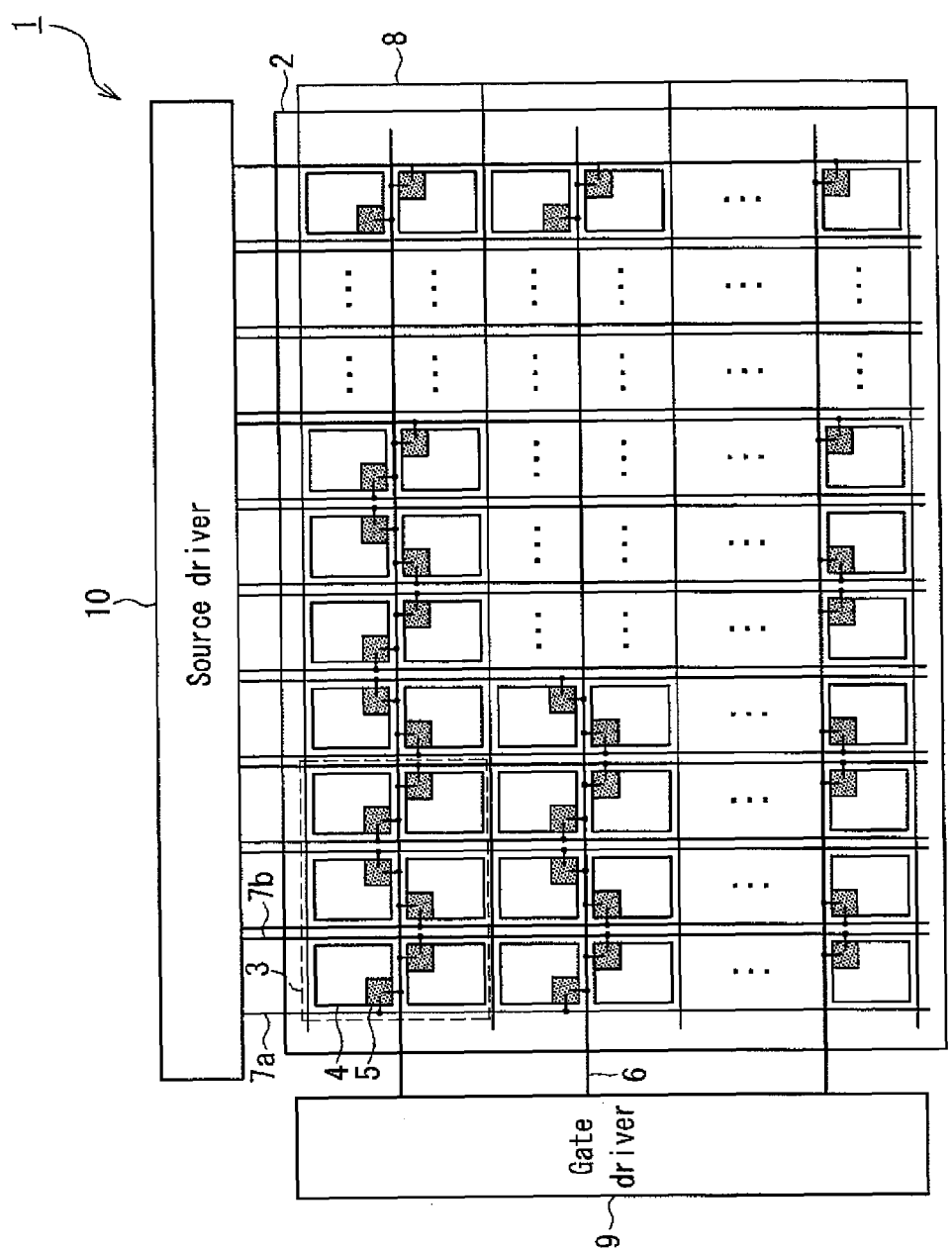
FIG. 1 is a block diagram showing a schematic configuration of a display device according to a preferred embodiment of the present invention.

A display device according to various preferred embodiments of the present invention includes a display element including a pixel constituted by a plurality of picture elements disposed in two lines in a longitudinal direction and two or more columns in a lateral direction, a gate wiring common to the plurality of picture elements, and a source wiring arranged perpendicular or substantially perpendicular to the gate wiring and to perform image display using inversion driving in which an image display signal is provided to picture elements connected to the gate wiring which is sequentially selected, at a different polarity than a polarity of an immediately previous frame. An effective value relative to the image display signal of picture elements belonging to one of the two lines changes as a result of the inversion driving of picture elements constituting another pixel disposed longitudinally adjacent to the one line, and an array of the picture elements in the pixel is determined such that a size of a total value of an index representing a brightness of picture elements belonging to the one line and a total value of the index representing the brightness of picture elements belonging to the other of the two lines compensates for a change in luminance following the change in the effective value of picture elements belonging to the one line.

According to this configuration, when picture elements constituting another pixel adjacent in the longitudinal direction, that is, adjoining picture elements connected to another gate wiring are inversion driven, an effective value relative to an image display signal of the picture elements changes, having been affected by the change in potential of the adjoining picture elements, and the resultant change in luminance, can be effectively reduced by defining the array of picture elements in a pixel using an index representing the brightness of picture elements.

In the above configuration, preferably the luminance of picture elements belonging to the one line changes in a decreasing direction as a result of the inversion driving of picture elements constituting the other pixel disposed longitudinally adjacent, and a total value of the index representing the brightness of picture elements belonging to the one line is larger than a total value of the index representing the brightness of picture elements belonging to the other line, or the luminance of picture elements belonging to the one line changes in an increasing direction as a result of the inversion driving of picture elements constituting the other pixel disposed longitudinally adjacent, and a total value of the index representing the brightness of picture elements belonging to the one line is smaller than a total value of the index representing the brightness of picture elements belonging to the other line.

This enables the change in luminance that occurs as a result of picture elements constituting a different adjoining pixel being inversion driven to be effectively covered by the array of picture elements.

Further, preferably the display element is a liquid crystal panel, and the liquid crystal panel is a transmissive panel, and further includes a backlight for irradiating light that is transmitted by the liquid crystal panel.

By utilizing a liquid crystal panel, which is the most widespread flat panel used in display devices, and also by using a transmissive liquid crystal panel provided with a backlight that has superior display image stability even among liquid crystal panels, a high image quality display device with high color reproducibility and little luminance unevenness can be readily realized.

In this case, preferably the liquid crystal panel is driven in a normally white mode, the effective value relative to the image display signal of picture elements belonging to one of the two lines increases as a result of the inversion driving of picture elements constituting another pixel disposed longitudinally adjacent to the one line, and a total value of the index representing the brightness of picture elements belonging to the one line is larger than a total value of the index representing the brightness of picture elements belonging to the other of the two lines.

Also, preferably the liquid crystal panel is driven in a normally white mode, the effective value relative to the image display signal of picture elements belonging to one of the two lines decreases as a result of the inversion driving of picture elements constituting another pixel disposed longitudinally adjacent to the one line, and a total value of the index representing the brightness of picture elements belonging to the one line is smaller than a total value of the index representing the brightness of picture elements belonging to the other of the two lines.

Further, preferably the liquid crystal panel is driven in a normally black mode, the effective value relative to the image display signal of picture elements belonging to one of the two lines increases as a result of the inversion driving of picture elements constituting another pixel disposed longitudinally adjacent to the one line, and a total value of the index representing the brightness of picture elements belonging to the one line is smaller than a total value of the index representing the brightness of picture elements belonging to the other of the two lines.

And also, preferably the liquid crystal panel is driven in a normally black mode, the effective value relative to the image display signal of picture elements belonging to one of the two lines decreases as a result of the inversion driving of picture elements constituting another pixel disposed longitudinally adjacent to the one line, and a total value of the index representing the brightness of picture elements belonging to the one line is larger than a total value of the index representing the brightness of picture elements belonging to the other of the two lines.

This enables the occurrence of luminance unevenness to be effectively reduced by the array of picture elements, when picture elements constituting an adjoining pixel are inversion driven in correspondence with respective drive modes of the liquid crystal panel, using the change in the effective value relative to the image display signal of picture elements due to the potential of the adjoining pixel.

Further, preferably the index representing the brightness of picture elements is a Y value in an XYZ color system.

This is because the Y value in an XYZ color system is commonly used as an index representing the brightness of picture elements.

In terms of the specific combinations of picture elements, it is conceivable that the picture elements included in the line whose total value of the index representing the brightness of picture elements is larger are cyan (C), magenta (M) and yellow (Y), and the picture elements included in the line whose total value of the index representing the brightness of picture elements is smaller are red (R), green (G) and blue (B), that the picture elements included in the line whose total value of the index representing the brightness of picture elements is larger are cyan (C), green (G) and yellow (Y), and the picture elements included in the line whose total value of the index representing the brightness of picture elements is smaller are red (R), magenta (M) and blue (B), that the picture elements included in the line whose total value of the index representing the brightness of picture elements is larger are magenta (M), red (R) and yellow (Y), and the picture elements included in the line whose total value of the index representing the brightness of picture elements is smaller are green (G), cyan (C) and blue (B), that the picture elements included in the line whose total value of the index representing the brightness of picture elements is larger are green (G), yellow (Y) and red (R), and the picture elements included in the line whose total value of the index representing the brightness of picture elements is smaller are, cyan (C) blue (B) and magenta (M), or that the picture elements included in the line whose total value of the index representing the brightness of picture elements is larger are green (G) and white (W), and the picture elements included in the line whose total value of the index representing the brightness of picture elements is smaller are red (R) and blue (B).

Further, preferably, in the pixel, a picture element of a color having a highest numeric value of the index representing the brightness of picture elements and a picture element of a color having a second highest numeric value of the index are not lined up in the longitudinal direction, and, in the pixel, a picture element of a color having a lowest numeric value of the index representing the brightness of picture elements and a picture element of a color having a second lowest numeric value of the index are not lined up in the longitudinal direction.

This enables longitudinal streaky luminance unevenness caused by differences in luminance that occurs due to picture elements whose numeric value of the index indicating the brightness of picture elements is high or low being disposed side-by-side in the longitudinal direction to be effectively prevented.

Further, preferably the gate wiring is provided between picture elements belonging to the one line constituting the pixel and picture elements belonging to the other line, and a first source wiring connected only to picture elements belonging to the one line and a second source wiring connected only to picture elements belonging to the other line are disposed so as to sandwich each column of the pixel.

With this configuration, effective disposition of wirings that enables the aperture ratio of picture elements to be secured can be realized.

Hereinafter, preferred embodiments of a display device of the present invention will be described with reference to the drawings. Note that while, hereinafter, the case where the display device according to preferred embodiments of the present invention is implemented preferably as a television receiver that uses a liquid crystal panel provided with a transmissive panel as a display element will be appropriately illustratively described, this description is not intended to limit the applicable scope of the present invention. Note that the concept of a transmissive panel in the description of the present invention is not limited to a panel that performs image display with only transmitted light, and also includes a so-called low reflection panel or semi-transmissive panel provided with reflective electrodes for improving the luminance of a display image by reflecting outside light within picture elements. Also, as for the display element according to a preferred embodiment of the present invention, a liquid crystal panel provided with a reflection panel can be used, for example, rather than being limited to such a liquid crystal panel having a transmissive panel, and the present invention can also be applied to a display device using various types of display elements that use an active matrix substrate, besides liquid crystal panels, such as a display device that uses an organic EL panel or a display device that uses an FED (Field Emission Display). Further, the usage of the display device is not limited to only a television receiver.

First Preferred Embodiment

FIG. 1 is a block configuration diagram illustrating a display device according to a first preferred embodiment of the present invention. As shown in FIG. 1, a display device 1 of the present preferred embodiment is provided with a transmissive liquid crystal panel 2, which a display element, a gate driver 9, and a source driver 10.

In the liquid crystal panel 2, a total of six picture elements 4 disposed in two lines in the longitudinal direction and three columns in the lateral direction constitute a single pixel 3, for example. While the colors of the picture elements 4 are decided by color filters formed in respective picture element areas, illustration thereof is omitted in FIG. 1. Note that the array of these color filters, that is, the array of colors of the picture elements 4 will be discussed later referring to FIG. 2 and beyond.

Each picture element 4 is provided with a TFT 5, which is a switching element arranged to control light transmissivity in the picture element 4 by applying a prescribed voltage to the portion of a liquid crystal layer where the picture element 4 is formed and changing an orientational state of liquid crystal molecules (not shown). Note that while picture element electrodes (not shown) arranged to apply a voltage to the liquid crystal layer are formed on the liquid crystal panel 2, illustration thereof is omitted in FIG. 1.

A gate wiring 6 is disposed in a line direction between the two lines of picture elements 4 constituting a single pixel 3. All of the TFTs 5 included in the six picture elements 4 defining a single pixel 3 are connected to the same gate wiring 6. When the gate driver 9 sequentially selects a gate wiring 6, two lines of picture elements 4, or in other words, one line of pixels 3 are all selected at the same time. Note that in the following description of preferred embodiments of the present invention, a state where a gate wiring 6, a source wiring 7, and a TFT 5 disposed in each picture element 4 are connected will be appropriately abbreviated and referred to as the gate wiring 6 and/or the source wiring 7 being connected to the picture element 4.

Also, the source wirings 7 are arranged along a column direction of the picture elements on both the left and right sides of each picture element 4, so as to be perpendicular or substantially perpendicular with the gate wirings 6. This is because a prescribed image display signal needs to be applied to each of the two picture elements 4 belonging to the two lines longitudinally arranged as one column, using two source wirings, since the two lines of picture elements 4 connected to a gate wiring 6 are selected as a result of that gate wiring 6 being selected, as described above. In the description of the present preferred embodiment, the source wiring disposed on the left side of the picture elements 4 will be represented as 7a, and the source wiring disposed on the right side will be represented as 7b, as shown in FIG. 1. Also, while disposing source wirings on both the left and right sides of each picture element 4 is preferred in terms of the aperture ratio of the picture elements 4 and the threading of the electrodes themselves, disposing source wirings on both sides is not essential, and two source wirings 7 can also be provided for any one of the columns of picture elements 4.

With the picture elements 4 in the column on the far left side, in the liquid crystal panel 2 according to the preferred embodiment shown in FIG. 1, the source wiring 7a on the left side of the column of picture elements 4 is connected to the TFTs 5 of picture elements 4 belonging to the upper odd numbered line in FIG. 1, and the source wiring 7b disposed on the right side of the column of picture elements is connected to the TFTs of picture elements 4 belonging to the lower even numbered line. Conversely, with the column of picture elements second from the left edge, the source wiring 7b on the right side of the column of picture elements 4 is connected to the TFTs 5 of picture elements 4 belonging to the upper odd numbered line in FIG. 1, and the source wiring 7a disposed the left side of the column of picture elements is connected to the TFTs of picture elements 4 belonging to the lower even numbered line.

The source wirings 7a and 7b are both connected to the source driver 10, and apply gray-scale signals, which are image display signals required for displaying an image with each of the picture elements 4, to the two lines of picture elements 4 constituting the one line of pixels whose gate wiring 6 is selected. Due to all of the gate wirings 6 being sequentially selected, one frame of image information is applied to all of the picture elements 4 formed on the image display screen of the liquid crystal panel 2, and image display is performed.

Note that auxiliary capacity wirings 8 are arranged above and below a single line of pixels 3 constituted by two lines of picture elements 4, in order for image display by the liquid crystal panel 2 to be more smoothly performed. The auxiliary capacity wirings 8 are fixed at a potential common to the entire area of the image display surface of the liquid crystal panel 2.

Also, illustration of a backlight, which is a light source arranged to irradiating light that is transmitted by the liquid crystal panel 2, a power supply circuit arranged to supply an operating voltage to the liquid crystal panel 2, the gate driver 9 and the source driver 10, and a signal processing circuit arranged to process image signals and the like is omitted.

Figure 2:
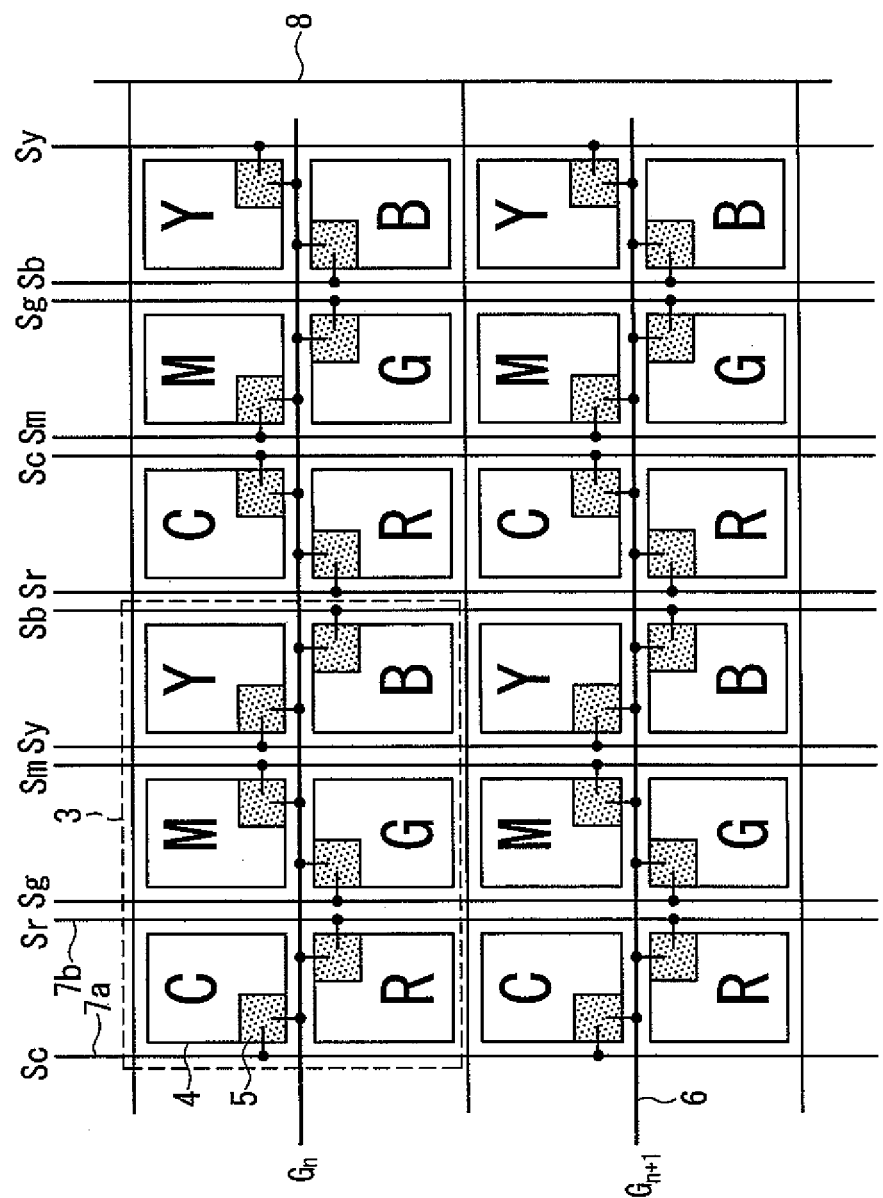
FIG. 2 is a main portion enlarged view showing a configuration of an image display area of a liquid crystal display panel according to a first preferred embodiment of the present invention.

Next, the array of picture elements 4 of the liquid crystal panel 2 according to the present preferred embodiment will be described with reference to FIG. 2. The liquid crystal panel 2 in the present preferred embodiment preferably performs six primary color display in which cyan (C), magenta (M) and yellow (Y) are added to picture elements of the usual three colors of red (R), green (G) and blue (B), as an example of multi-primary color image display. The color reproduction range that can be expressed can thus be expanded by adding to the usual three RGB primary colors, the three CMY primary colors, which are respectively in a complementary color relation therewith.

Here, the connection of each of the picture element 4 is as shown in FIG. 1, with two lines of picture elements 4 firstly being connected to the same single gate wiring 6 in the longitudinal direction. Note that in FIG. 2, $G_n$ represents the nth gate wiring, and $G_{n+1}$ represents the following n+1th gate wiring. This single gate wiring 6 is connected to all of the picture elements 4 constituting a single line of pixels 3. The auxiliary capacity wirings 8 are arranged above and below a single line of pixels 3.

The source wirings 7 are arranged on both sides of each column of picture element 4, and connected to the TFT 5 formed in each picture elements 4. In FIG. 2, the source wirings 7 have appended thereto the colors of the picture elements to which each corresponds. For example, a source wiring Sc connected to the cyan (C) picture elements is provided on the left side of the far left column in FIG. 2 in which cyan (C) and red (R) picture elements are provided, and a source wiring Sr connected to the red (R) picture elements is disposed on the right side. Also, with the column of magenta (M) and green (G) picture elements second from the left, Sg is formed on the left and Sm on the right. Further, with the third column formed by yellow (Y) and blue (B) picture elements, Sy is on the left and Sb on the right. With the following forth to sixth columns, the left and right connections in each of the columns are the inverse of the connections of the first to third columns, and are sequentially SrSc, SmSg and SbSy.

Figure 14:
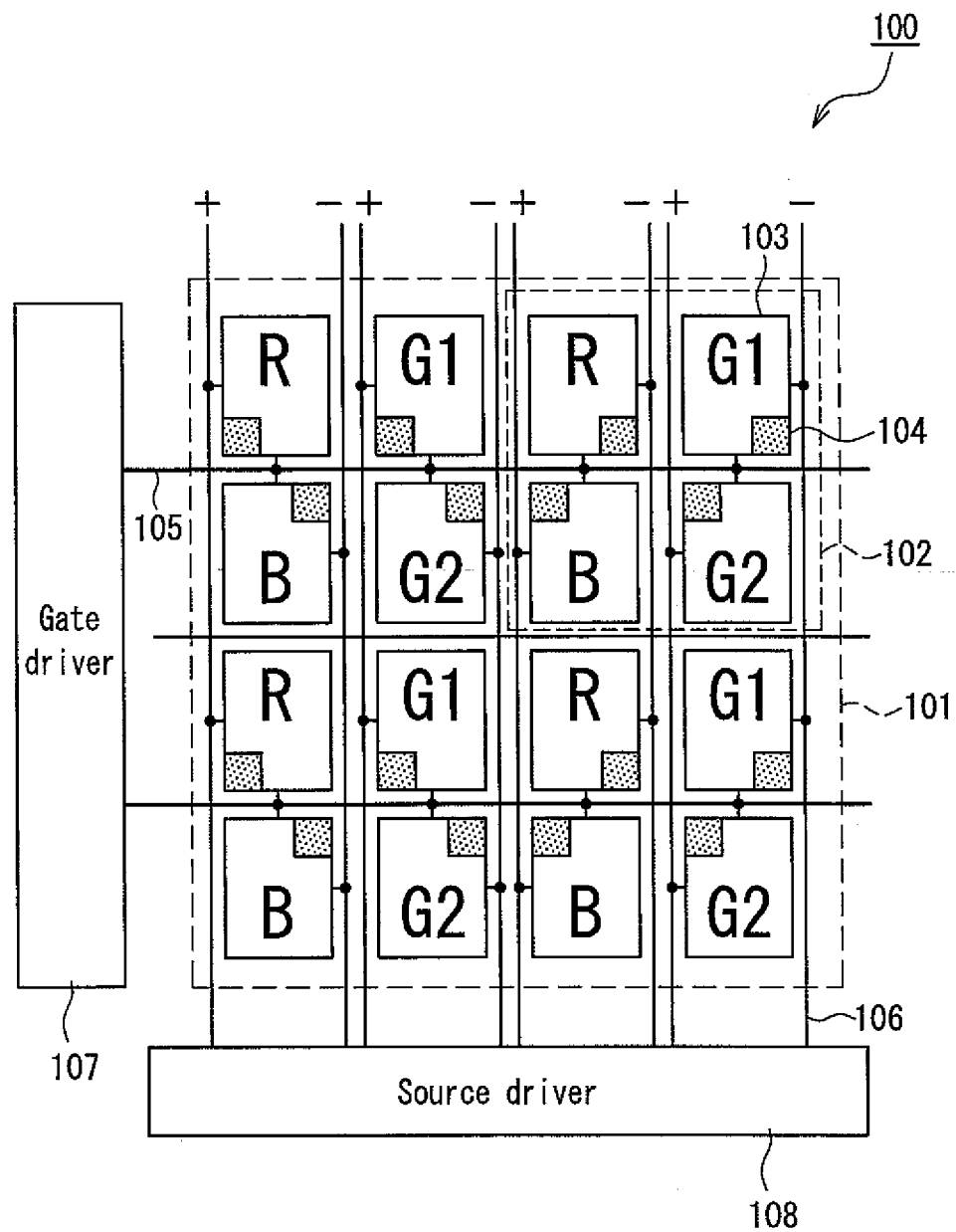
FIG. 14 shows a configuration of an image display surface of a conventional liquid crystal display element.

As also illustrated in FIG. 1, with the display device according to a preferred embodiment of the present preferred embodiment, the source wiring to which picture elements belonging to the first line of picture elements are connected is differentiated from the source wiring to which picture elements belonging to the second line of picture elements are connected, in the first column of picture elements and the second column of picture elements. Thus, in the case of the present preferred embodiment, source wirings 7 to which same color picture elements, such as cyan (C) in FIG. 2, for example, are connected in adjoining pixels will be alternately different on the left and right, since a single pixel is constituted by six picture elements disposed in two lines and three columns. Accordingly, a drop in display image quality due to the occurrence of flicker can be prevented even in the case of displaying monochromatic images, similarly to the case of the conventional technique shown in FIG. 14.

Incidentally, when a white image was actually displayed on a liquid crystal panel thus formed, it was found that contrasting white streaky luminance unevenness was noticeable at times, due to a difference in luminance arising between the white displayed by the three CMY primary colors of the first line of picture elements and the white displayed by the three RGB primary colors of the second line.

As a result of investigations by the inventors, it was revealed that this streaky luminance unevenness is caused by an effective value relative to the image display signal changing in picture elements belonging to one of the two lines of picture elements formed, due to inversion driving when performing image display. This principle will now be described.

Figure 3A:
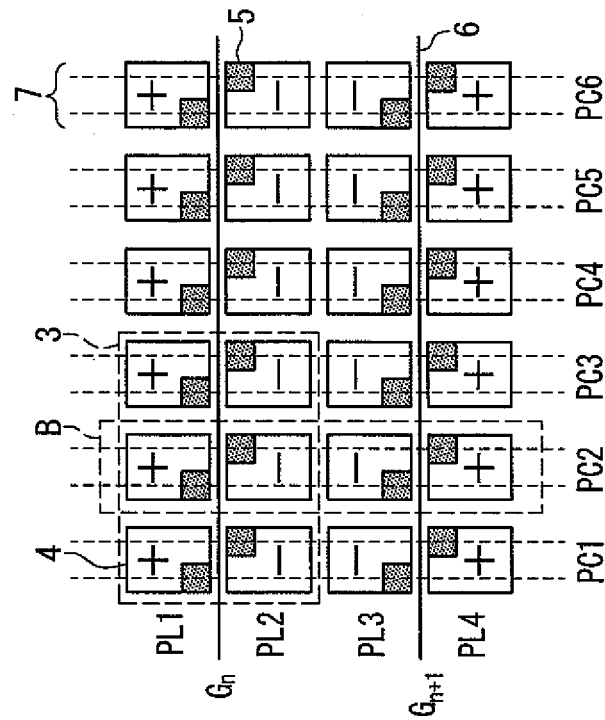
FIGS. 3A and 3B show the polarities of pixels in the case where inversion driving is performed such that the polarity of picture elements constituting longitudinally adjoining pixels will be the same.
Figure 3B:
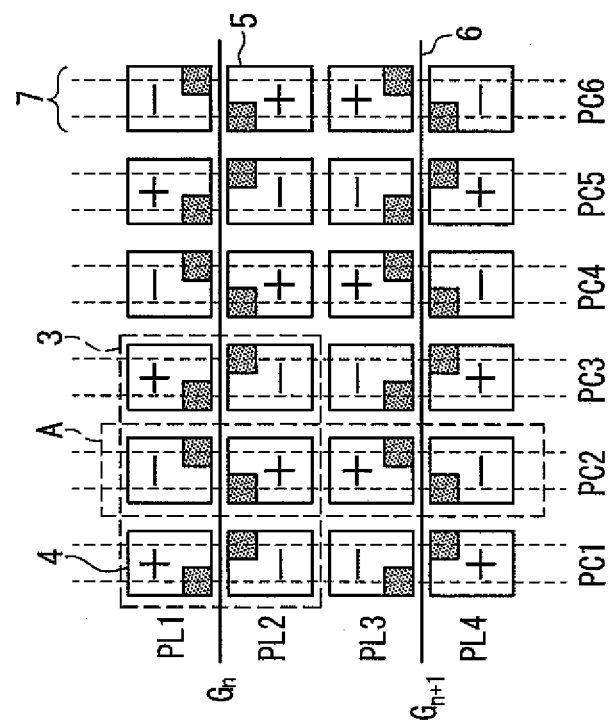

FIGS. 3A and 3B are enlarged views of an image display surface of the liquid crystal panel 2 of the display device according to the present preferred embodiment. Note that while only four lines and six columns of picture elements are shown in FIGS. 3A and 3B, the image display surface of the liquid crystal panel is formed by these patterns being repeated multiple times. Also, for convenience of description, the lines of picture elements 4 from the top in the figures will be called PL1 to PL4, and the columns of picture elements from the left in the figures will be called PC1 to PC6. As shown in the figures, the six picture elements 4 in total from PC1 to PC3 belong respectively to the lines PL1 and PL2 constitute a single pixel 3. Similarly, the six picture elements 4 from PC4 to PC6 belonging respectively to PL1 and PL2, the six picture elements 4 from PC1 to PC3 belonging respectively to PL3 and PL4, and the six picture elements 4 from PC4 to PC6 belonging respectively to PL3 and PL4 respectively constitute pixels. In FIG. 3, the polarities of the picture elements 4 are represented as "+" or "−" therein, since the polarity of each of the picture element 4 becomes an issue when performing inversion driving. Also, the gate wirings 6 indicated by $G_n$ and $G_{n+1}$, the source wirings 7, and the TFTs 5 connected thereto that are provided per picture elements 4 are similar to those shown in FIG. 2.

FIG. 3A shows the state of the liquid crystal panel 2 in the case of dot inversion driving, with the polarity of each picture element 4 being inverted relative to adjoining picture elements 4. Also, in a single pixel 3, the polarities of picture elements 4 belonging to the upper and lower lines sandwiching a gate wiring 6 therebetween are inverted.

Next, FIG. 3B shows the case where line inversion driving is performed. The polarity of each of the picture elements 4 differs per line of picture elements 4.

Here, a common feature of both patterns shown in FIG. 3A and FIG. 3B is that the polarities of picture elements 4 in adjacent lines are the same, between longitudinally adjacent pixels 3. That is, in both FIG. 3A showing dot inversion driving and FIG. 3B showing line inversion driving, when the polarities of the picture elements 4 belonging to the lines PL2 and PL3 of picture elements 4 constituting different pixels 3 adjacent in the longitudinal direction are compared, the picture elements 4 belonging to all of the columns PC1 to PC6 each have the same polarity. Note that, as described above, the patterns of picture elements 4 shown in FIG. 3A and FIG. 3B are repeated within the image display surface of the liquid crystal panel 2. Here, it can be said that inversion driving is performed such that, on comparison of adjoining pixels 3, the polarities of picture elements 4 belonging to adjacent lines of picture elements 4 are always the same, in the patterns shown in FIG. 3A and FIG. 3B, because the same polarities are also shown for the picture elements 4 belonging respectively to the lines PL4 and PL1 of picture elements 4, as is clear on comparison of the respective polarities in the columns PC1 to PC6 of picture elements 4.

Figure 4A:
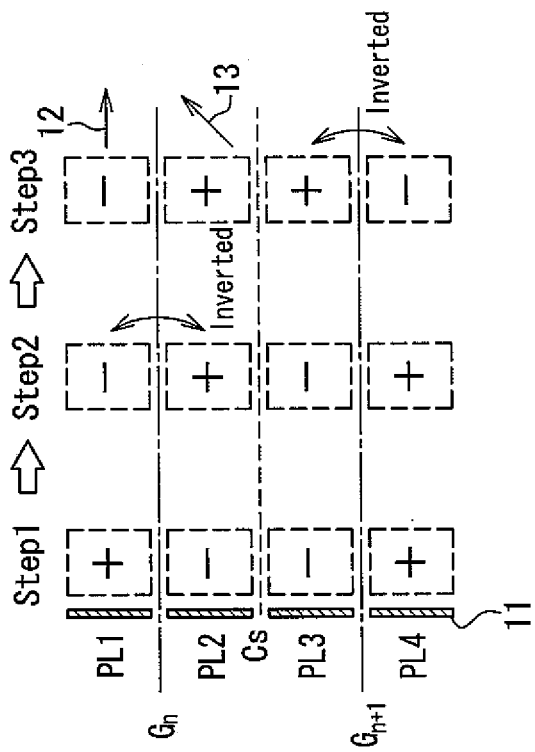
FIGS. 4A and 4B show a state where an effective value rises, as a result of inversion driving in picture elements constituting longitudinally adjoining pixels.
Figure 4B:
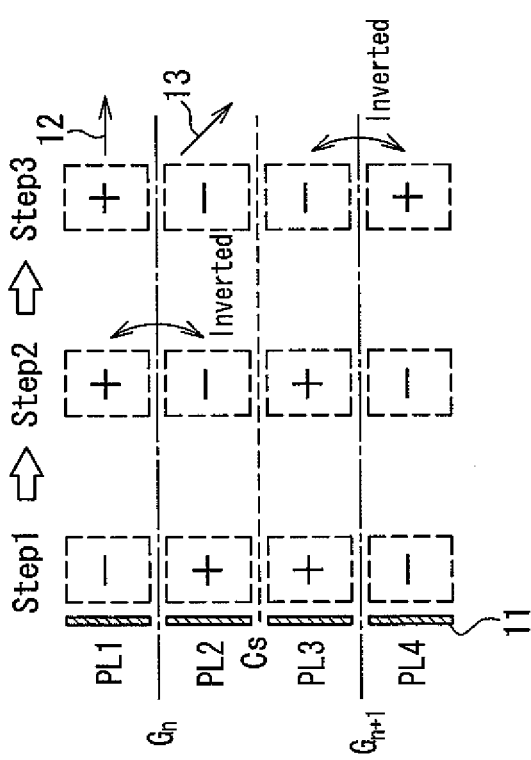
Figure 5B:
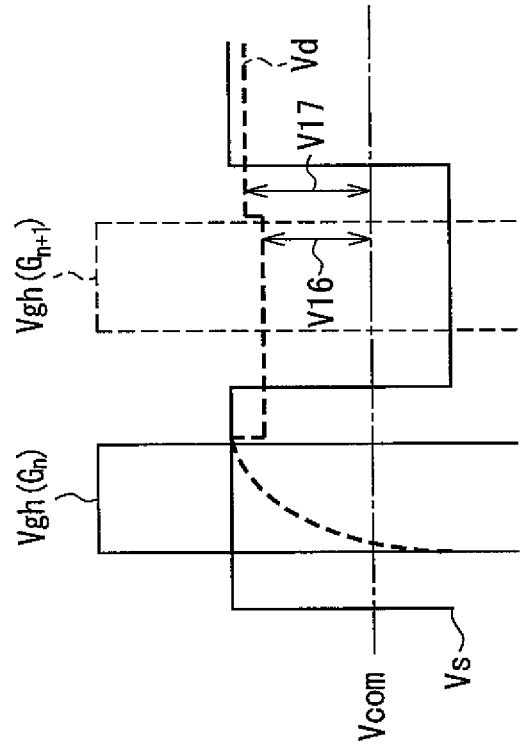
FIGS. 5A and 5B show a state of voltages in the case where an effective value rises, as a result of inversion driving in picture elements constituting longitudinally adjoining pixels.
Figure 5A:
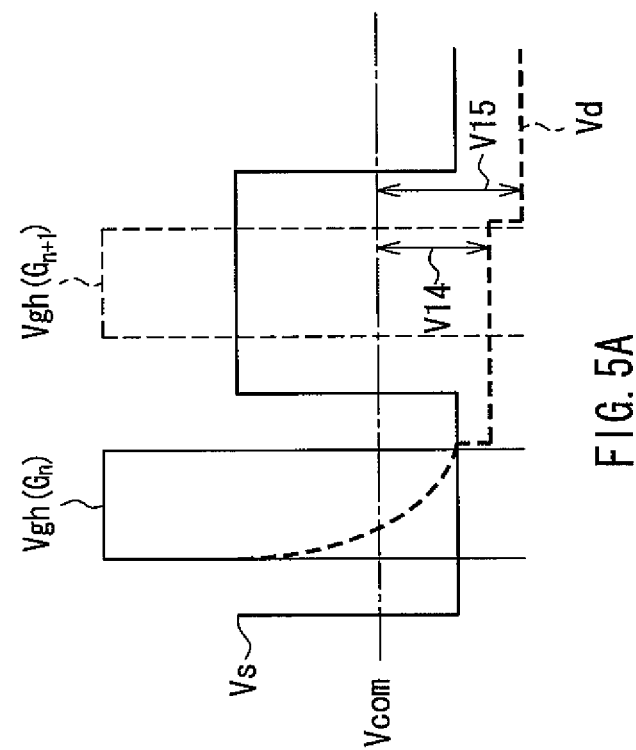

FIGS. 4A and 4B show states where a single column of picture elements 4 shown in FIGS. 3A and 3B is extracted and the polarities are inverted while sequentially scanning the column, and FIGS. 5A and 5B show the change in voltage of electrodes disposed in picture elements 4 in the case where this polarity inversion has occurred. Note that an image of the electrode arrangement in the liquid crystal panel 2 is shown on the left edge in FIGS. 4A and 4B. Corresponding picture element electrodes 11 are provided in each of picture elements 4, and gate wirings $G_n$ and $G_{n+1}$ are disposed between the first line PL1 of picture elements and the second line PL2 of picture elements in the figures, and between the third line PL3 of picture elements and the forth line PL4 of picture elements, so as to correspond with FIGS. 3A and 3B. Cs denotes the auxiliary capacity wiring 8.

FIG. 4A shows the change in polarity due to inversion driving in the second column PC2 of picture elements in FIG. 3A shown as A in the figure. The focus here is on the picture element positioned in PL2, which is the line adjacent to the adjoining pixel. The polarity of this picture element belonging to PL2 and PC2 changes to "−" in the next frame, given the "+" polarity in the state of FIG. 3A. Note that, needless to say, the picture elements belonging to the columns PC4 and PC6 of picture elements shown in FIG. 3A that have the same polarity undergo the same operation, because at issue is only the change of polarity.

Step 1 in FIG. 4A shows the polarities provided to the picture elements before inversion driving is performed, that is, the state in FIG. 3A. The polarities of each of the picture elements are "−" "+" "+" "−" in order from the top.

Next, from step 2 to step 3, inversion driving is performed in order to display the image of the next frame, and since the gate wirings are sequentially selected and driven, firstly the nth gate wiring $G_n$ is selected, and the polarities of the picture element belonging to PL1 and the picture element belonging to PL2 connected to this gate wiring $G_n$ are inverted. In FIG. 4A, the picture element belonging to PL1 changes from "−" to "+", and the polarity of the picture element belonging to PL2 changes from "+" to "−". Note that at this point, since the next gate wiring $G_{n+1}$ has still not been selected, the polarities of the picture elements belonging to PL3 and PL4 constituting the lower pixel adjacent in longitudinal direction respectively remain as "+" and "−", without changing.

In step 3, the next gate wiring is selected, and polarity inversion occurs in the picture elements connected to the gate wiring $G_{n+1}$. The polarity of the picture element belonging to PL3 changes from "+" to "−", and the polarity of the picture element belonging to PL4 changes from "−" to "+".

At this time, the potential of the picture element of interest belonging to PL2 is affected by the polarity of a picture element belonging to another pixel adjacent in the longitudinal direction being inverted, that is, by a picture element constituting the pixel constituted by picture elements belonging to PL3 and PL4, which is longitudinally adjacent to the pixel constituted by picture elements belonging to PL1 and PL2 to which PL2 belongs, being inverted.

This state will be described with reference to FIG. 5A.

As shown in FIG. 5A, a gate signal Vgh ($G_n$) is applied, when the nth gate wiring $G_n$ is selected. The picture element belonging to PL2 has a negative potential Vs applied thereto from the source wiring, and is inverted to a "−" polarity. At this time, the potential Vd of the picture element electrode gradually drops, as shown by the dotted line, because of the capacity component of liquid crystal, and reaches the same potential as Vs, before subsequently reaching an even lower constant potential due to the fall of Vgh when selection of the nth gate wiring ends. Here, the potential for image display applied to the liquid crystal layer is Δ(Vcom−Vd), which is V14 in FIG. 5A. This potential indicates the original display gray-scale.

The following n+1th gate wiring is selected, and Vgh ($G_{n+1}$) is applied to the gate wiring $G_{n+1}$. Note that this signal is shown with a dotted line, because of not being directly applied to the picture element belonging to PL2. Then, when this n+1th gate signal Vgh ($G_{n+1}$) falls, the potential of the picture element belonging to PL3 adjacent to PL2 changes from "+" to "−", as shown in step 3 of FIG. 4A. At this time, the potential of the picture element belonging to PL2 is affected by the potential of the picture element belonging to the adjoining PL3 changing to "−" and drops further, as shown in FIG. 5A. As a result, Δ(Vcom−Vd) which is the potential difference that provides a gray-scale for image display in the pixel belonging to PL2 will be V15, which is greater than V14, as shown in FIG. 5A.

In FIG. 4A, the state where the picture element belonging to PL2 is thus reduced to a lower potential from the "−" polarity state maintained after the gate wiring $G_n$ was selected, due to the polarity of the picture element belonging to the adjoining PL3 changing from "+" to "−", is shown by a downward arrow 13. Note that since the picture element belonging to PL1, which is not adjacent to the picture element connected to the gate wiring $G_{n+1}$, is not affected by the change in potential resulting from the picture element connected to this gate wiring $G_{n+1}$ being inverted, the potential thereof does not change. This state is shown with a horizontal arrow 12 in FIG. 4A.

Next, in contrast to the case in FIG. 4A and FIG. 5A, a state where the polarity of the picture element of interest belonging to PL2 which is affected by the polarity of the picture element belonging to an adjoining pixel being inverted changes from "−" to "+" due to inversion driving will be described with reference to FIG. 4B and FIG. 5B. Note that the description will be appropriately abbreviated, because basic portions apart from the different polarities are the same as those shown in FIG. 4A and FIG. 5A.

The polarity inversion operation shown in FIG. 4B relates to the picture elements belonging to PC2 shown as B in FIG. 3B. Note that, as described above, because the same operation will be performed if the array of the polarities of the picture elements is the same, the picture elements belonging to the columns PC1, PC3 and PC5 in FIG. 3A and the picture elements belonging to the columns other than PC2 belonging to FIG. 3B will undergo the same operation.

Step 1 in FIG. 4B shows the polarities provided to the picture elements before inversion driving is performed, that is, the state in FIG. 3B. The polarities of each of the picture elements are "+" "−" "−" "+" in order from the top.

Next, from step 2 to step 3, the nth gate wiring $G_n$ is selected, and the polarities of the picture element belonging to PL1 and the picture element belonging to PL2 connected to this gate wiring $G_n$ are inverted. In FIG. 4B, the picture element belonging to PL1 changes from "+" to "−", and the polarity of the picture element belonging to PL2 changes from "−" to "+". The polarities of the picture elements belonging to PL3 and PL4 respectively remain as "−" and "+", without changing.

In step 3, polarity inversion occurs in the picture elements connected to the gate wiring $G_{n+1}$, with the polarity of the picture element belonging to PL3 changing from "−" to "+", and the polarity of the picture element belonging to PL4 changing from "+" to "−".

The change in the potential of the picture element of interest belonging to PL2 at this time will be described with reference to FIG. 5B. As shown in FIG. 5B, when a gate signal Vgh ($G_n$) is applied, the picture element belonging to PL2 is inverted to a "+" polarity, as a result of a positive potential Vs being applied from the source wiring. At this time, the potential Vd of the picture element electrode gradually rises, as shown by the dotted line, because of the capacity component of liquid crystal, and reaches the same potential as Vs, before subsequently reaching a slightly lower constant potential due to the fall of Vgh when selection of the nth gate wiring ends. Here, the potential for image display applied to the liquid crystal layer is Δ(Vcom−Vd), which is V16 in FIG. 5B. This potential indicates the original display gray-scale.

Vgh ($G_{n+1}$) is applied to the next gate wiring $G_{n+1}$ after the following n+1th gate wiring is selected, and when this n+1th gate signal Vgh ($G_{n+1}$) falls, the potential of the picture element belonging to PL3 adjacent to PL2 changes from "−" to "+", as shown in step 3 of FIG. 4B. At this time, the potential of the picture element belonging to PL2 rises, as shown in FIG. 5B, having been affected by the potential of the picture element belonging to the adjoining PL3 changing to "+". As a result, Δ(Vcom−Vd) which is the potential difference that provides a gray-scale for image display in the pixel belonging to PL2 will be V17, which is greater than V16, as shown in FIG. 5B. Accordingly, it is evident that, even in this case, the gray-scale voltage for performing image display is greater than the original voltage, and that the effective value has increased.

In FIG. 4B, the state where the picture element belonging to PL2 is raised to a higher potential from the "+" polarity state maintained after the gate wiring $G_n$ was selected, due to the polarity of the picture element belonging to the adjoining PL3 changing from "−" to "+", is shown by an upward arrow 13. Note that, even in the case shown in FIG. 4B, since the picture element belonging to PL1, which is not adjacent to the picture element connected to the gate wiring $G_{n+1}$, is not affected by the change in potential, the potential thereof does not change. This state is shown with a horizontal arrow 12 in FIG. 4B.

When there is a change in the potential of picture elements, such as shown in FIG. 4A and FIG. 4B, the potential based on the image signal to be displayed in each picture element changes, having been affected by the change in potential of adjacent picture elements. As a result, the potential of the picture element electrode changes from the applied potential originally to be displayed, and image display is performed at a different gray-scale. Since this is a phenomenon where the potential contributing to image display actually changes relative to the prescribed potential that is applied, this phenomenon will be referred to in the present invention as a change in the effective value relative to the image display signal of the picture elements.

As described with reference to FIGS. 4A and 4B and FIGS. 5A and 5B, in the case where the potentials of picture elements constituting adjoining pixels have the same polarity, the effective value relative to the image signal of the picture elements changes in an upward direction, and a potential difference larger than the potential difference resulting from the voltage applied for image display is applied to the liquid crystal layer, due to the gate wirings being sequentially selected and driven, irrespective of whether the polarity is positive or negative.

Next, the case where the potentials of picture elements constituting adjoining pixels differ will be described this time, using FIGS. 6A to 8B. Note that FIGS. 6A and 6B correspond to the above FIGS. 3A and 3B showing the case where the potentials of picture elements constituting adjoining pixels are the same, FIGS. 7A and 7B correspond to FIGS. 4A and 4B, and FIGS. 8A and 8B correspond to FIGS. 5A and 5B. In the description from FIG. 6A to FIG. 8B, portions that are the same as FIG. 3A to FIG. 5B will thus be appropriately abbreviated.

Figure 6B:
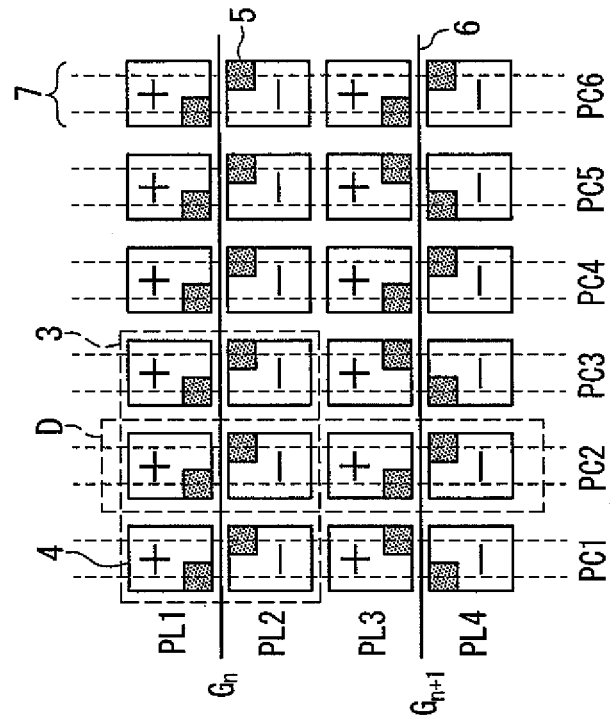
FIGS. 6A and 6B show the polarities of pixels in the case where inversion driving is performed such that the polarity of picture elements constituting longitudinally adjoining pixels will be different.
Figure 6A:
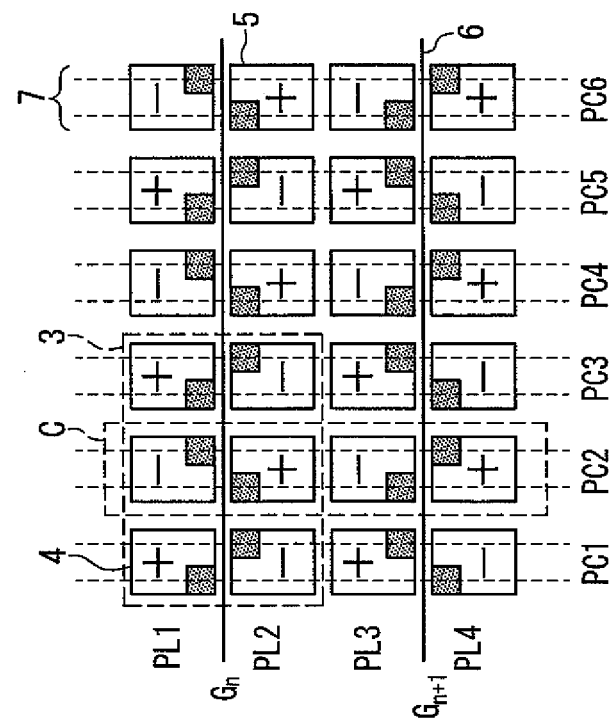

FIG. 6A shows the state of the liquid crystal panel 2 in the case of dot inversion driving, with the polarity of each picture element being inverted relative to adjoining picture elements. Also, in a single pixel 3, the polarities of picture elements 4 belonging to the upper and lower lines sandwiching a gate wiring 6 therebetween are inverted.

Next, FIG. 6B shows the case where line inversion driving is performed. The polarity of each of the picture elements 4 differ per line of picture elements 4.

Here, with both of the patterns shown in FIG. 6A and FIG. 6B, the polarities of the picture elements in adjacent lines differ between longitudinally adjacent pixels 3. That is, in both FIG. 6A showing dot inversion driving and FIG. 6B showing line inversion driving, when the polarities of the picture elements 4 belonging to the lines PL2 and PL3 of picture elements 4 constituting different pixels adjacent in the longitudinal direction are compared, the picture elements 4 belonging to all of the columns PC1 to PC6 each have different polarities. Similarly to the case of FIGS. 3A and 3B, these patterns are repeated over the entire liquid crystal panel. Here, it can be said that inversion driving is performed such that, on comparison of adjoining pixels 3, the polarities of picture elements belonging to adjacent lines are always different, in the patterns shown in FIG. 6A and FIG. 6B, because different polarities are also shown for the picture elements 4 belonging respectively to the lines PL4 and PL1 of picture elements 4, as is clear upon comparison of the respective polarities in the columns PC1 to PC6 of picture elements 4.

Figure 7A:
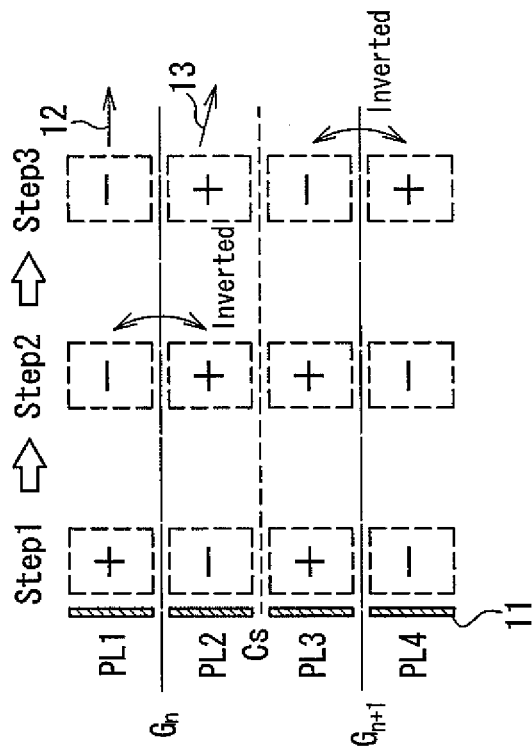
FIGS. 7A and 7B show a state where an effective value falls, as a result of inversion driving in picture elements constituting longitudinally adjoining pixels.
Figure 7B:
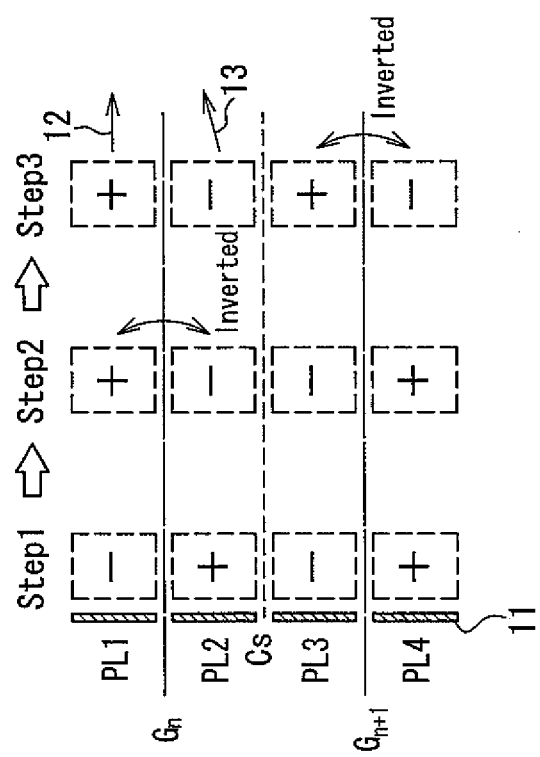
Figure 8B:
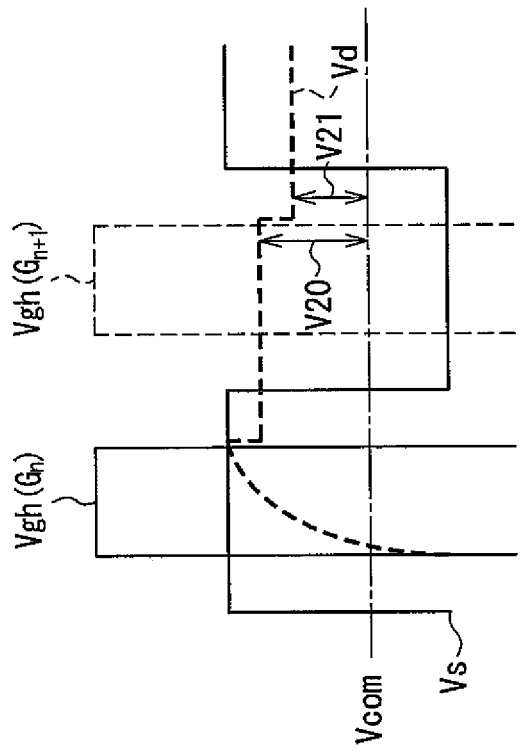
FIGS. 8A and 8B show a state of voltages in the case where an effective value falls, as a result of inversion driving in picture elements constituting longitudinally adjoining pixels.
Figure 8A:
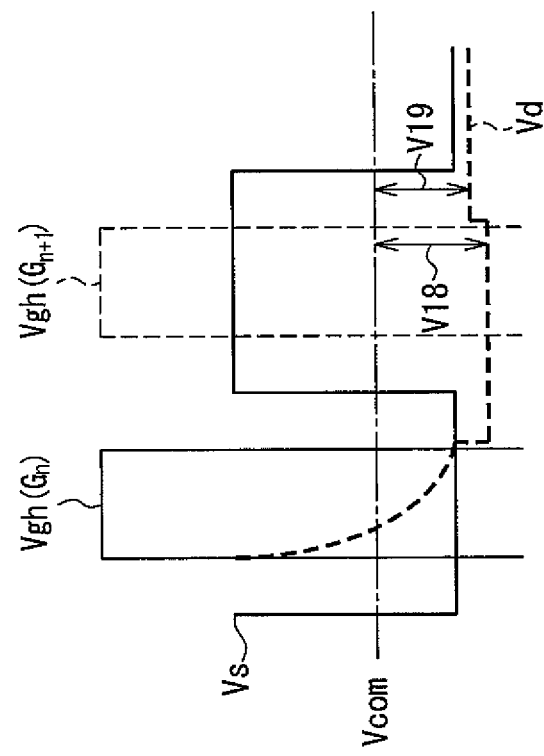

FIGS. 7A and 7B show states where a single column of picture elements shown in FIGS. 6A and 6B is extracted and the polarities are inverted while sequentially scanning the column, and FIGS. 8A and 8B show the change in voltage of electrodes disposed in picture elements in the case where this polarity inversion has occurred.

FIG. 7A shows the change in polarity due to inversion driving in the second column PC2 of picture elements in FIG. 6A shown as C in the figure. The picture elements belonging to the columns PC4 and PC6 of picture elements shown in FIG. 7A having the same polarity undergo the same operation.

Step 1 in FIG. 7A shows the polarities provided to the picture elements before inversion driving is performed, that is, the state in FIG. 6A. The polarities of the each of the picture elements are "−" "+" "−" "+" in order from the top.

Next, from step 2 to step 3, inversion driving is performed, and firstly the nth gate wiring $G_n$ is selected, and the polarities of the picture element belonging to PL1 and the picture element belonging to PL2 connected to this gate wiring $G_n$, are inverted. In FIG. 7A, the picture element belonging to PL1 changes from "−" to "+", and the polarity of the picture element belonging to PL2 changes from "+" to "−".

In step 3, the next gate wiring is selected, and polarity inversion occurs in the picture elements connected to the gate wiring $G_{n+1}$. The polarity of the picture element belonging to PL3 changes from "−" to "+", and the polarity of the picture element belonging to PL4 changes from "+" to "−".

The effect on the potential of the picture element of interest belonging to PL2 at this time will be described with reference to FIG. 8A. As shown in FIG. 8A, a gate signal Vgh ($G_n$) is applied, when the nth gate wiring $G_n$ is selected. Since the picture element belonging to PL2 is inverted to a "−" polarity as a result of a negative potential Vs being applied from the source wiring, the potential Vd of the picture element electrode gradually drops, as shown by the dotted line, because of the capacity component of liquid crystal, and reaches the same potential as Vs, before subsequently reaching an even lower constant potential due to the fall of Vgh when selection of the nth gate wiring ends. Here, the potential for image display applied to the liquid crystal layer is Δ(Vcom−Vd), which is V18 in FIG. 8A. This potential indicates the original display gray-scale.

The following n+1th gate wiring is selected, and Vgh ($G_{n+1}$) is applied to the gate wiring $G_{n+1}$. Then, when this n+1th gate signal Vgh ($G_{n+1}$) falls, the potential of the picture element belonging to PL3 adjacent to PL2 changes from "−" to "+", as shown in step 3 of FIG. 7A. At this time, the potential of the picture element belonging to PL2 rises slightly, as shown in FIG. 8A, having been affected by the potential of the picture element belonging to the adjacent PL3 changing to "+". As a result, Δ(Vcom−Vd) which is the potential difference that provides a gray-scale for image display in the pixel belonging to PL2 will be V19, which is greater than V18, as shown in FIG. 8A.

In FIG. 7A, the state where the picture element belonging to PL2 is raised to a slightly higher potential from the "−" polarity state maintained after the gate wiring $G_n$ was selected, due to the polarity of the picture element belonging to the adjoining PL3 changing from "−" to "+", is shown by a slightly upward arrow 13. Note that since the picture element belonging to PL1, which is not adjacent to the picture element connected to the gate wiring $G_{n+1}$, is not affected by the change in potential resulting from the picture element connected to this gate wiring $G_{n+1}$ being inverted, the potential thereof does not change. This state is also shown in FIG. 7A with a horizontal arrow 12.

Next, a state where the polarity of the picture element of interest belonging to PL2 which is affected by the polarity of the picture element belonging to an adjoining pixel being inverted changes from "−" to "+" due to inversion driving will be described with reference to FIG. 7B and FIG. 8B.

The polarity inversion operation shown in FIG. 7B relates to the picture elements belonging to PC2 shown as D in FIG. 6B. Note that, as described above, because the same operation will be performed if the array of the polarities of the picture elements is the same, the picture elements belonging to the columns PC1, PC3 and PC5 in FIG. 6A and the picture elements belonging to the columns other than PC2 belonging to FIG. 6B will undergo the same operation.

Step 1 in FIG. 7B shows the polarities provided to the picture elements before inversion driving is performed, that is, the state in FIG. 6B. The polarities of each of the picture elements are "+" "−" "+" "−" in order from the top.

Next, from step 2 to step 3, the nth gate wiring $G_n$ is selected, and the polarities of the picture element belonging to PL1 and the picture element belonging to PL2 connected to this gate wiring $G_n$ are inverted. In FIG. 7B, the picture element belonging to PL1 changes from "+" to "−", and the polarity of the picture element belonging to PL2 changes from "−" to "+". The polarities of the picture elements belonging to PL3 and PL4 respectively remain as "+" and "−", without changing.

In step 3, polarity inversion occurs in the picture elements connected to the gate wiring $G_{n+1}$, with the polarity of the picture element belonging to PL3 changing from "+" to "−", and the polarity of the picture element belonging to PL4 changing from "−" to "+".

The change in the potential of the picture element of interest belonging to PL2 at this time will be described with reference to FIG. 8B. As shown in FIG. 8B, when a gate signal Vgh ($G_n$) is applied, the picture element belonging to PL2 is inverted to a "+" polarity, as a result of a positive potential Vs being applied from the source wiring. At this time, the potential Vd of the picture element electrode gradually rises, as shown by the dotted line, because of the capacity component of liquid crystal, and reaches the same potential as Vs, before subsequently reaching a slightly lower constant potential due to the fall of Vgh when selection of the nth gate wiring ends. Here, the potential for image display applied to the liquid crystal layer is Δ(Vcom−Vd), which is V20 in FIG. 8B. This potential indicates the original display gray-scale.

Vgh ($G_{n+1}$) is applied to the next gate wiring $G_{n+1}$ after the following n+1th gate wiring is selected, and when this n+1th gate signal Vgh ($G_{n+1}$) falls, the potential of the picture element belonging to PL3 adjacent to PL2 changes from "+" to "−", as shown in step 3 of FIG. 7B. At this time, the potential of the picture element belonging to PL2 falls slightly, as shown in FIG. 8B, having been affected by the potential of the picture element belonging to the adjacent PL3 changing to "−". As a result, Δ(Vcom−Vd) which is the potential difference that provides a gray-scale for image display in the pixel belonging to PL2 will be V21, which is less than V20, as shown in FIG. 8B. Accordingly, it is evident that, even in this case, the gray-scale voltage for performing image display is less than the original voltage, and that the effective value has decreased.

In FIG. 7B, the state where the picture element belonging to PL2 is reduced to a slightly lower potential from the "+" polarity state maintained after the gate wiring $G_n$, was selected, due to the polarity of the picture element belonging to the adjoining PL3 changing from "+" to "−", is shown by a slightly downward arrow 13. Note that, even in the case shown in FIG. 7B, since the picture element belonging to PL1, which is not adjacent to the picture element connected to the gate wiring $G_{n+1}$, is not affected by the change in potential, the potential thereof does not change. This state is shown with a horizontal arrow 12 in FIG. 7B.

As described with reference to FIGS. 7A and 7B and FIGS. 8A and 8B, in the case where the potentials of picture elements constituting adjoining pixels have different polarities, the effective value changes in a downward direction, that is, a potential difference smaller than the potential difference resulting from the voltage applied for image display is applied to the liquid crystal layer, due to the gate wirings being sequentially selected and driven, irrespective of whether the polarities are positive or negative.

Even in FIG. 7B, since the picture element belonging to the first line, which is not adjacent to the picture element connected to the gate wiring $G_{n+1}$, is not affected by the change in potential resulting from the picture element connected to this gate wiring $G_{n+1}$ being inverted, the potential thereof does not change, similarly to the case in FIG. 7A. Accordingly, this state is also shown with a horizontal arrow 12 in FIG. 7B.

As described with reference to FIGS. 7A and 7B and FIGS. 8A and 8B, in the case where the potentials of adjacent lines of picture elements constituting adjoining pixels have different polarities, the effective value relative to the image signal of the picture elements changes in a downward direction, and a potential difference smaller than the potential difference resulting from the voltage applied for image display is applied to the liquid crystal layer, due to the gate wirings being sequentially selected and driven, irrespective of whether the polarities are positive or negative.

As described above, in a liquid crystal panel having a structure in which two lines of picture elements are connected to a single gate wiring, and a single pixel is constituted by picture elements disposed in two lines, a phenomenon arises whereby the effective value relative to the image signal of picture elements belonging to a line adjacent to a different pixel changes, having been affected by the inversion driving of picture elements belonging to a longitudinally adjacent line constituting another adjoining pixel, when the polarities of two lines of picture elements connected to gate wirings that are sequentially selected are inversion driven. Note that, in the above description, dot inversion driving and line inversion driving, which are currently the mainstream in terms of inversion driving methods, were illustrated. However, the occurrence of the phenomenon whereby the effective value changes is not limited to these inversion driving methods, and similarly occurs in the case where image display is performed using inversion driving in which an image display signal of a different polarity to the polarity of the immediately pervious frame is provided, when two lines of picture elements are sequentially selected with a single gate wiring. Accordingly, a similar change in the effective value relative to an image display signal also occurs in the case where frame inversion driving is performed, for example.

Next, the relationship between this change in the effective value relative to the image signal of picture elements and streaky luminance unevenness in the line direction will be described.

While the transmissive liquid crystal panel according to the present preferred embodiment displays images by controlling the amount of light that is transmitted by the liquid crystal layer based on input gray-scale signals, the methods of controlling transmitted light include two modes consisting of a normally white mode and a normally black mode. The normally white mode is a mode for ensuring that transmitted light is not blocked by the liquid crystal layer when the gray-scale signal is 0, and accordingly, if a high gray-scale signal is applied, that picture element will block the transmitted light and the display image will become darker. Conversely, in the normally black mode, the display image becomes brighter the higher the gray-scale signal applied, since the liquid crystal layer is controlled to completely block transmitted light when the gray-scale signal is 0.

Since the brightness of the display image resulting from an input gray-scale signal will be the exact opposite, depending on the mode for controlling transmitted light, consideration needs to be given to which mode to use, when considering the change in the effective value relative to the image signal of picture elements described with reference to the above FIGS. 3A to 8B.

As described with reference to the above FIGS. 3A to 5B, in the case where, in a picture element belonging to one of the two lines constituting a pixel, the effective value relative to the image signal of that picture element increases, having been affected by a picture element constituting another adjoining pixel being inversion driven, the effect is the same as if a higher gray-scale signal had been applied, as the gray-scale signal applied to that picture element.

In the case of a liquid crystal panel in the normally white mode in which display luminance decreases the higher the gray-scale value, the luminance difference between white luminance displayed by the three CMY primary colors and white luminance displayed by the three RGB primary colors can be compensated for, by arraying the three CMY primary color picture elements whose white luminance at the same gray-scale is naturally high in the line in which the effective value changes, and arraying the three RGB primary color picture elements whose white luminance is low in the other line. Note that compensation in the description of preferred embodiments of the present invention denotes working toward reducing the luminance difference, rather than compensating completely until the luminance difference completely disappears. Further, using this array also has the advantage of chromaticity and white expressed by the three RGB colors not readily deviating, since the luminance of all of the three colors RGB does not change.

In contrast to this, in the case of a liquid crystal panel in the normally black mode in which display luminance increases the higher the gray-scale value, the luminance difference between white luminance displayed by the three CMY primary colors and white luminance displayed by the three RGB primary colors can be compensated for, by arraying the three RGB primary color picture elements whose white luminance at the same gray-scale is naturally low in the line in which the effective value changes, and arraying the three CMY primary color picture elements whose white luminance is high in the other line. Further, using this array also has the advantage of chromaticity and white expressed by the three RGB colors not readily deviating, since the luminance of all of the three colors RGB increases.

Also, as described with reference to the above FIGS. 6A to 8B, in the case where, in a picture element belonging to one of the two lines constituting a pixel, the effective value relative to the image signal of that picture element decreases, having been affected by the inversion driving of a picture element constituting another adjoining pixel, the effect is the same as if a lower gray-scale signal had been applied, as the gray-scale signal applied to that picture element.

In the case of a liquid crystal panel in the normally white mode in which display luminance increases the lower the gray-scale value, the luminance difference between white luminance displayed by the three CMY primary colors and white luminance displayed by the three RGB primary colors can be compensated for, by arraying the three RGB primary color picture elements whose white luminance at the same gray-scale is naturally low in the line in which the effective value changes, and arraying the three CMY primary color picture elements whose white luminance is high in the other line. Further, using this array also has the advantage of chromaticity and white expressed by the three RGB colors not readily deviating, since the luminance of all of the three colors RGB increases.

In contrast to this, in the case of a liquid crystal panel in the normally black mode in which display luminance increases the higher the gray-scale, the luminance difference between white luminance displayed by the three CMY primary colors and white luminance displayed by the three RGB primary colors can be compensated for, by arraying the three CMY primary color picture elements whose white luminance at the same gray-scale is naturally high in the line in which the effective value changes, and arraying the three RGB primary color picture elements whose white luminance is low in the other line. Further, using this array also has the advantage of chromaticity and white expressed by the three RGB colors not readily deviating, since the luminance of all of the three colors RGB does not change.

Streaky luminance unevenness perceived in a display image during white display can thus be effectively reduced and minimized, by compensating for the luminance difference caused by the colors of the picture elements arrayed in two lines constituting a single pixel, using the change in the effective value relative to the image display signal of the picture elements belonging to the line adjacent to the adjoining pixel, which occurs as a result of the picture elements constituting the adjoining pixel being inversion driven.

Figure 9:
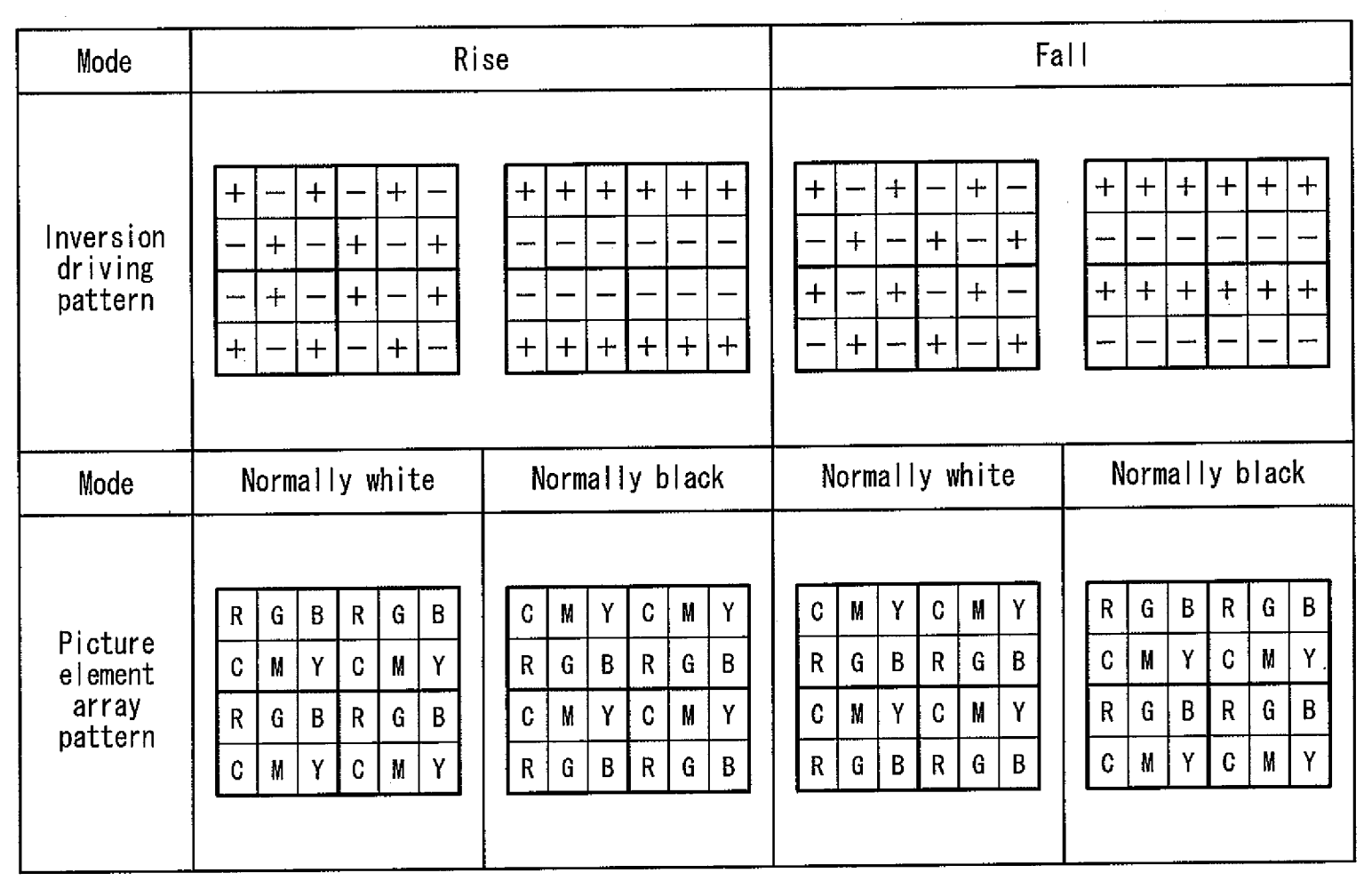

The array patterns of picture elements that make the streaky luminance unevenness that appears during image display less noticeable are collected in FIG. 9, with consideration given to the change in display luminance resulting from of the change in the effective value relative to the image display signal of the picture elements, which occurs due to the picture elements constituting the adjoining pixel being inversion driven, as described above. As shown in FIG. 9, streaky unevenness that occurs during white image display can be effectively reduced, by disposing the array pattern of picture elements so as to negate the luminance difference that exists in the combination of picture elements, with consideration given to whether to make the polarities between adjacent pixels the same or different as the inversion driving method in the liquid crystal panel, and which of the normally white mode or the normally black mode to use as the image display mode.

Note that since a transmissive liquid crystal panel has been illustrated above, investigations were conducted regarding the normally white mode and the normally black mode as the display mode. However, this way of thinking can itself also be similarly applied in the case of a so-called self light-emitting display panel such as an EL panel that does not perform image display by controlling transmitted light such as a liquid crystal panel.

For example, the case where a gray-scale signal directly controls the luminance of light-emitting elements, that is, the case where a gray-scale signal is directly applied to the electrode of one of the display picture elements, and the light emission luminance increases due to the potential difference increasing, may be thought of in the same manner as the normally black mode in the above liquid crystal panel. Note that a normal self light-emitting image display panel has such a voltage application structure. Also, the case where, in contrast to this, the light emission luminance in the picture elements decreases the higher the gray-scale signal applied, such as when an inverted voltage of a gray-scale signal is applied to the electrode of a picture element, may be thought of in the same manner as the normally white mode in the liquid crystal panel.

Second Preferred Embodiment

Hereinafter, various patterns of picture element arrays in a liquid crystal display panel according to the present invention will be described as a second preferred embodiment. Note that because the configuration serving as a display device 1 that includes the configuration of a liquid crystal panel 2, and driving circuits such as a gate driver 9 and a source driver 10 for performing image display by driving the liquid crystal panel 2, shown as the following second preferred embodiment, other than the patterns of picture element arrays, is preferably substantially the same as that according to the first preferred embodiment described above, description thereof will be omitted.

Also, illustrated as the picture element array patterns serving as the second preferred embodiment in FIGS. 10A and 10B and beyond is the case where, as a result of a picture element constituting an adjoining pixel being inversion driven, the effective value relative to the image display signal of a picture element belonging to a line adjacent to this pixel rises, as described with reference to FIGS. 3A to 5B in the above first preferred embodiment, and where image display is in the normally black mode. Accordingly, the picture element array pattern will also be the same in the case where, as a result of a picture element constituting an adjoining pixel being inversion driven, the effective value relative to the image display signal of a picture element belonging to a line adjacent to this pixel falls, and where image display is in the normally white mode. In contrast to this, the array pattern of picture elements constituting each pixel will be inverted between the upper and lower lines, in the case where, as a result of a picture element constituting an adjoining pixel being inversion driven, the effective value relative to the image display signal of a picture element belonging to a line adjacent to this pixel falls, and where image display is in the normally black mode, and in the case where, as a result of a picture element constituting an adjoining pixel being inversion driven, the effective value relative to the image display signal of a picture element belonging to a line adjacent to this pixel rises, and where image display is in the normally white mode.

Figures 10A, 10B:
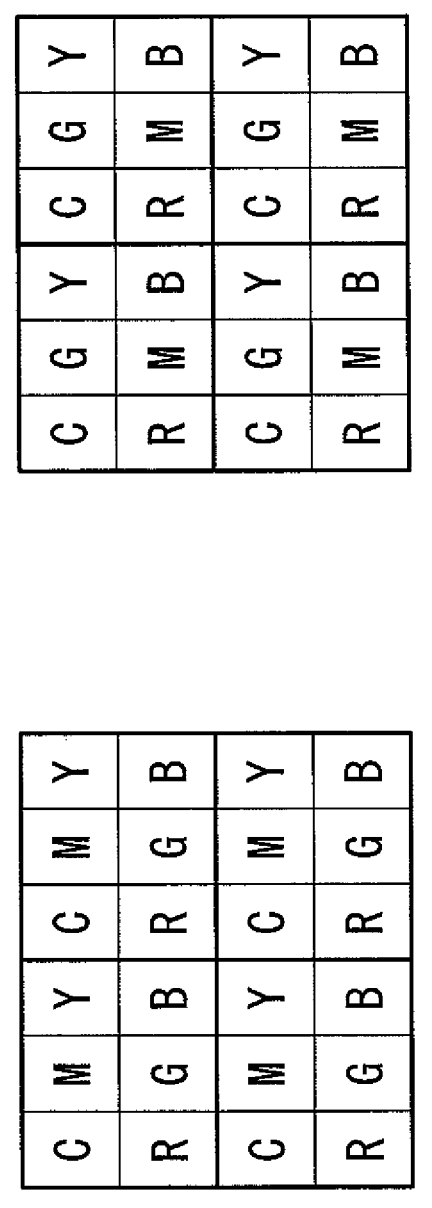

FIG. 10A is the pixel array pattern described in the first preferred embodiment shown for verification, with the picture elements belonging to the other line on the upper side when viewing a single pixel being the three CMY primary colors, and the picture elements belonging to the one line on the lower side in which the effective value relative the image display signal changes, having been affected by the picture element of the adjoining pixel being inversion driven, being the RBG three primary colors. Here, because the case shown in FIG. 10A is where the effective value relative to the image display signal of a picture element belonging to an adjacent line rises, and where image display is in the normally black mode, the array of picture elements constituting a single pixel is such that the brightness of the picture elements belonging to the lower of the two lines is less than the picture elements belonging to the other line on the upper side.

Here, in the present preferred embodiment, as a method of evaluating the brightness of a plurality of picture elements belonging to a given line of picture elements, the Y value of an XYZ color system is used with regard to picture elements of two or more colors belonging to respective lines of a single pixel. Specifically, the Y values of picture elements belonging to the respective lines are totaled, and the larger total value is judged to be brighter.

FIG. 10B shows an example of a different picture element array of the six primary color image display pattern using the same three CMY primary colors and three RGB primary colors as shown in FIG. 10A, with the three CGY colors and three RMB colors belonging to respective lines of picture elements. The picture elements of the three colors CGY, which is a combination of the brighter picture elements, and the picture elements of the three colors RMB, which is a combination of the darker picture elements, respectively belong to the upper line in which the effective value relative to the image display signal of picture elements does not change as a result of the inversion driving of picture elements constituting an adjoining pixel, and to the lower line in which the effective value does change.

Figures 11A, 11B:
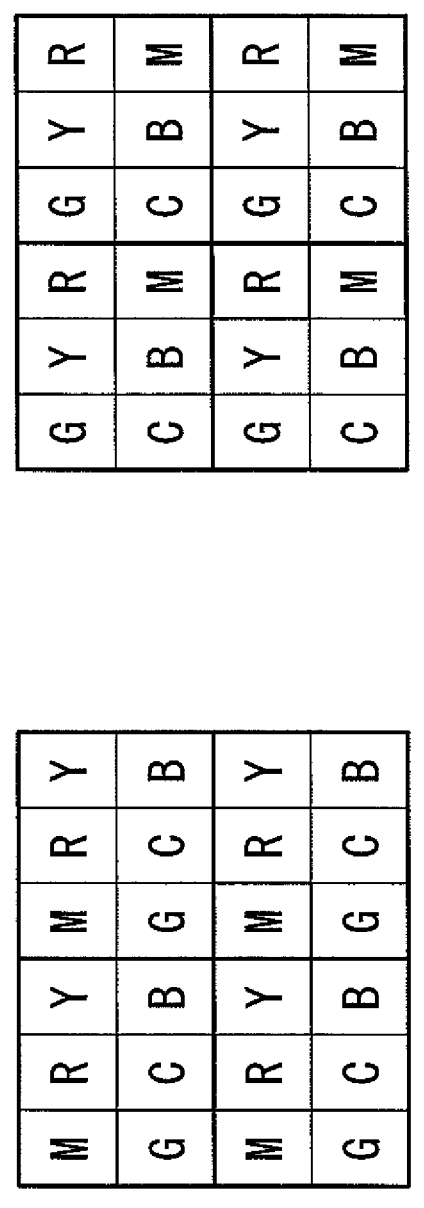

Next, FIGS. 11A and 11B also show picture element arrays in the case where multi-primary color image display using the six colors CYMRGB is similarly performed. In FIG. 11A, the three colors MRY serving as a combination of brighter picture elements, and the three colors GCB forming a combination of darker picture element respectively belong to the other line on the upper side in which the effective value does not change, and the one line on the lower side in which the effective value does change. Also, in FIG. 11B, the three colors GRY and the three colors CBM respectively belong to the other line on the upper side and the one line on the lower side.

Figures 12, 13:
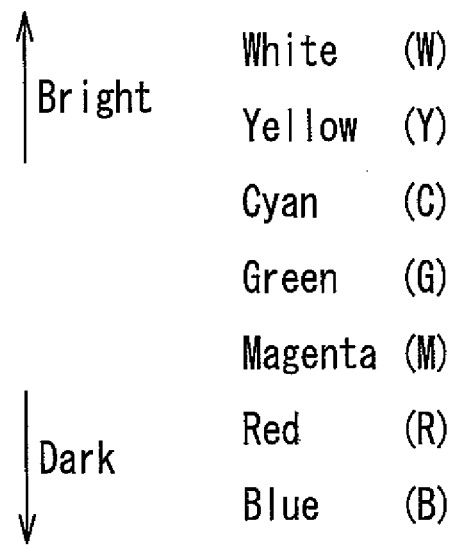
FIG. 12 shows a further different picture element array pattern according to the second preferred embodiment of the present invention.
FIG. 13 shows a size relationship of the numeric values of an index representing the brightness of picture elements.

Next, in FIG. 12, a pattern of a picture element array constituted by adding a white (W) picture element to the three RGB colors is shown, as an example of multi-primary color display with four colors. In this case, the two color picture elements G and W with larger Y values, and the two color picture elements R and B with smaller Y values respectively belong to the other line on the upper side in which the effective value does not change, and the one line on the lower side in which the effective value does change.

Hereinabove, the display device according to various preferred embodiments of the present invention, in the case where two lines of picture elements are connected to a single gate wiring in the case where multi-primary color image display is performed, can be configured to eliminate streaky luminance unevenness, by devising the array of pixels, utilizing the fact that the effective value relative to the image display signal of a picture element belonging to the line on the side adjacent to an adjoining pixel changes as a result of picture elements constituting the adjoining pixel being inversion driven. Also, specific patterns of picture element arrays have been described in the above first preferred embodiment and second preferred embodiment. In investigating such array patterns of picture elements according to preferred embodiments of the present invention, a total value of an index representing the brightness of picture elements belonging to the respective lines may be derived, and the change in luminance may be negated based on the size relationship thereof. Accordingly, the specific array patterns of picture elements are not limited to those illustrated above, and picture elements of various colors used in multi-primary color image display can be arrayed with consideration given to the total value of an index indicating the brightness thereof.

FIG. 13 shows the size relationship of numeric values shown by an index regarding the brightness of respective picture elements in a liquid crystal panel of the display device described as the present preferred embodiment. As shown in FIG. 13, the brightest is white (W), and the picture elements become darker in order of yellow (Y), cyan (C), green (G), magenta (M), red (R) and blue (B).

Note that the size relationship of the numeric values indicating the brightness of picture elements shown in FIG. 13 indicates the color filters typically used as color filters of a liquid crystal panel that are provided in picture elements of the respective colors. Naturally, these numeric values of the index indicating the brightness of the picture elements differs if the materials and film thicknesses of the color filters differ, and also depending on the waveform distribution of the backlight, the composition of the various materials forming the liquid crystal cells, and the like. Accordingly, the case where the size relationship of indices indicating the brightness of picture elements differs to those shown in FIG. 13 is also sufficiently possible.

Here, in the preferred embodiments of the present invention, investigations were conducted using the Y value in an XYZ color system, as an index representing the brightness of the colors of the various picture elements. In an XYZ color system, since the indices X and Z are considered not to have brightness, and only the Y (=luminous reflectance) value is provided with brightness, this Y value is the most appropriate to be used as an index indicating the brightness of the respective colors.

However, needless to say, the index representing brightness in the present invention is not limited to this Y value of an XYZ color system. For example, in terms of an index indicating the brightness of picture elements in a liquid crystal panel, it is conceivable, in the case where the effect of wavelength distribution of the backlight is minimal, to be able to use the transmissivity of a color filter as an index, because the transmissivity of a color filter controls the actual brightness. Also, in the case of a self light-emitting element such as an EL panel, the luminance of respective picture elements can be directly used as an index representing the brightness of picture elements.

Also, an array of picture elements that reduces streaky luminance unevenness in preferred embodiments of the present invention as described above is understood as being a total value of the brightness of picture elements belonging to the lines of picture elements in each pixel. In the array of picture elements in each pixel, picture elements of two or three colors, for example, are disposed in a single line, but the same array is repeated in the disposition pattern of picture elements in each pixel because of image signal processing, and the array sequence of picture elements belonging to each line is unlikely to be perceived as a luminance difference. Accordingly, in the array patterns of picture elements shown in the above preferred embodiments, the colors of the picture elements belonging to respective lines is important, and there is absolutely no problem in terms of the application of the present invention if the array sequences of picture elements in the lines to which respective picture elements belong differ.

In investigating the disposition of picture elements in respective lines, picture elements whose numeric value of the index representing the brightness thereof is high or low preferably are not lined up in the longitudinal direction.

For example, consider a case such as where a picture element with the highest numeric value of the index indicating the brightness and a picture element with the second highest numeric value of the index out of picture elements of six colors belong to different lines, in the case of constituting a single pixel by picture elements of six colors. In such a case, when the picture element with the highest numeric value of the index indicating the brightness and the picture element with the second highest numeric value are lined up in the longitudinal direction, that is, so as to belong to the same column, that column alone will be brighter than the other two columns. The difference in brightness due to this column will then be perceived as longitudinal luminance unevenness. In contrast to this, in the case where picture elements whose numeric value of the index indicating brightness is low are lined up in the longitudinal direction, this time that column alone will have low brightness, and will be perceived as longitudinal luminance unevenness.

Accordingly, it can be said that preferably at least the picture element of a color with the highest numeric value of the index representing brightness and the picture element of a color with the second highest numeric value are not lined up in the longitudinal direction, and the picture element of a color with the lowest numeric value of the index representing brightness and the picture element of a color with the second lowest numeric value are not lined up in the longitudinal direction, out of the picture elements constituting each pixel.

Specifically, in the case where multi-primary color image display using the six CMYRGB primary colors as described in the above preferred embodiments is investigated, preferably yellow (Y) with the highest numeric value of the index representing brightness and cyan (C) with the second highest numeric value, or yellow (Y) and green (G), are not lined up in the longitudinal direction, that is, do not belong to the same column. Conversely, preferably blue (B) with the smallest numeric value of the index representing brightness and red (R) with the second smallest numeric value of the index, or blue (B) and magenta (M), are not lined up in the longitudinal direction.

Also, in the case of display being performed with the four RGBW colors, as shown in FIG. 12, preferably W and G with high numeric values of the index representing brightness and R and B with low numeric values are not lined up in the longitudinal direction.

Also, in describing the above preferred embodiments of the present invention, examples in which a single pixel is constituted by two lines of picture elements longitudinally and two or three columns of picture elements laterally were discussed, but the present invention is not limited to this, and can be applied to the case where a pixel is constituted by arraying two lines of picture elements longitudinally and four or more columns of picture elements laterally, and a similar effect to the specific examples shown in the above preferred embodiments can be achieved.

Further, in the preferred embodiments showing specific examples of the display device of the present invention, description was given using an example in which gate wirings are sequentially selected and scanned from top to bottom, but the present invention is not limited to this, and can, needless to say, also be applied in the case where gate wirings are sequentially selected and scanned from bottom to top. In this case, the picture element whose effective value relative to the image display signal changes as a result of the polarity of a picture element belonging to another adjacent pixel being inverted will belong to the upper line of the two lines. Consequently, in the examples of pixel arrays, the pixels belonging to the upper and lower lines will all be switched.

Note that in the above description of preferred embodiments of the present invention, a display device for displaying images with the screen in a landscape state, based on a normal use state of a display device, was described. Thus, source wirings are disposed in a column direction that is understood as being a longitudinal direction or up/down direction, and gate wirings are disposed in a line direction that is understood as being in a lateral direction or left/right direction. However, the present invention is not limited to this, and can, needless to say, also be applied in the case where images are displayed with the screen rotated 90 degrees to a portrait state as the use state of the display device. In this case, since the respective directions are rotated 90 degrees, the line direction will be in the longitudinal direction and the column direction will be in the lateral direction. In terms of screen display in a state such as this where the screen is in a portrait state, information display in public facilities such as stations or art galleries has been made viable.

The present invention is industrially applicable as a display device that uses a display element in which plural lines of picture elements are connected to a single gate wiring, which is used when performing multi-primary color image display.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
a display element including a plurality of pixels, each of the plurality of pixels being constituted by a plurality of picture elements, the plurality of picture elements of each of the plurality of pixels being arranged in two rows and arranged in two or more columns, at least one pair of the picture elements in a direction of the two or more columns are different colors from each other;
a gate wiring common to the plurality of picture elements; and
a source wiring arranged perpendicular or substantially perpendicular to the gate wiring and arranged to perform image display using inversion driving in which an image display signal is provided to the picture elements that are connected to the gate wiring which is sequentially selected, at a different polarity than a polarity of an immediately previous frame; wherein
an effective value relative to the image display signal of picture elements belonging to one of the two rows changes as a result of the inversion driving of picture elements constituting another pixel disposed longitudinally adjacent to the one row; and
an arrangement of the picture elements in each of the plurality of pixels is such that:
when a luminance of the picture elements belonging to the one of the two rows changes in a decreasing direction as a result of the inversion driving of the picture elements constituting the another pixel disposed longitudinally adjacent, a total value of an index representing a brightness of the picture elements belonging to the one of the two rows is larger than a total value of an index representing a brightness of the picture elements belonging to the another row; and
when the luminance of the picture elements belonging to the one of the two rows changes in an increasing direction as a result of the inversion driving of the picture elements constituting the another pixel disposed longitudinally adjacent, the total value of the index representing the brightness of the picture elements belonging to the one of the two rows is smaller than the total value of the index representing the brightness of the picture elements belonging to the another row.

2. The display device according to claim 1, wherein the display element is a liquid crystal panel.

3. The display device according to claim 2, wherein the liquid crystal panel is a transmissive panel, and further includes a backlight arranged to irradiate light that is transmitted by the liquid crystal panel.

4. The display device according to claim 3, wherein when the liquid crystal panel is driven in a normally white mode, the effective value relative to the image display signal of picture elements belonging to one of the two rows increases as a result of the inversion driving of picture elements constituting another pixel disposed longitudinally adjacent to the one row, the total value of the index representing the brightness of picture elements belonging to the one row is larger than the total value of the index representing the brightness of picture elements belonging to the other of the two rows.

5. The display device according to claim 3, wherein when the liquid crystal panel is driven in a normally white mode, the effective value relative to the image display signal of the picture elements belonging to one of the two rows decreases as a result of the inversion driving of the picture elements constituting another pixel disposed longitudinally adjacent to the one row, a total value of the index representing the brightness of the picture elements belonging to the one row is smaller than a total value of the index representing the brightness of the picture elements belonging to the other of the two rows.

6. The display device according to claim 3, wherein when the liquid crystal panel is driven in a normally black mode, the effective value relative to the image display signal of the picture elements belonging to one of the two rows increases as a result of the inversion driving of the picture elements constituting another pixel disposed longitudinally adjacent to the one row, the total value of the index representing the brightness of the picture elements belonging to the one row is smaller than the total value of the index representing the brightness of the picture elements belonging to the other of the two rows.

7. The display device according to claim 3, wherein when the liquid crystal panel is driven in a normally black mode, the effective value relative to the image display signal of the picture elements belonging to one of the two rows decreases as a result of the inversion driving of the picture elements constituting another pixel disposed longitudinally adjacent to the one row, the total value of the index representing the brightness of the picture elements belonging to the one row is larger than the total value of the index representing the brightness of the picture elements belonging to the other of the two rows.

8. The display device according to claim 1, wherein the index representing the brightness of the picture elements is a Y value in an XYZ color system.

9. The display device according to claim 1, wherein when the picture elements included in the row having a total value of the index representing the brightness of the picture elements that is relatively larger are cyan, magenta, and yellow, the picture elements included in the row having a total value of the index representing the brightness of the picture elements that is relatively smaller are red, green, and blue.

10. The display device according to claim 1, wherein when the picture elements included in the row having a total value of the index representing the brightness of the picture elements that is relatively larger are cyan, green, and yellow, the picture elements included in the row having a total value of the index representing the brightness of the picture elements that is relatively smaller are red, magenta, and blue.

11. The display device according to claim 1, wherein when the picture elements included in the row having a total value of the index representing the brightness of the picture elements that is relatively larger are magenta, red, and yellow, the picture elements included in the row having a total value of the index representing the brightness of the picture elements that is relatively smaller are green, cyan, and blue.

12. The display device according to claim 1, wherein when the picture elements included in the row having a total value of the index representing the brightness of the picture elements that is relatively larger are green, yellow, and red, the picture elements included in the row having a total value of the index representing the brightness of the picture elements that is relatively smaller are, cyan, blue, and magenta.

13. The display device according to claim 1, wherein when the picture elements included in the row having a total value of the index representing the brightness of the picture elements that is relatively larger are green and white, the picture elements included in the row having a total value of the index representing the brightness of the picture elements that is relatively smaller are red and blue.

14. The display device according to claim 1, wherein in the plurality of pixels, a picture element of a color having a highest numeric value of the index representing the brightness of the picture elements and a picture element of a color having a second highest numeric value of the index are not lined up in the longitudinal direction.

15. The display device according to claim 1, wherein in the plurality of pixels, a picture element of a color having a lowest numeric value of the index representing the brightness of the picture elements and a picture element of a color having a second lowest numeric value of the index are not lined up in the longitudinal direction.

16. The display device according to claim 1, wherein the gate wiring is provided between the picture elements belonging to the one row constituting the pixel and the picture elements belonging to the other row, and a first source wiring connected only to the picture elements belonging to the one row and a second source wiring connected only to the picture elements belonging to the other row are arranged so as to sandwich each column of the pixel.

* * * * *